(12) United States Patent
Prezeau et al.

(10) Patent No.: US 9,382,609 B2
(45) Date of Patent: Jul. 5, 2016

(54) SURFACE TREATMENT OF A METAL PART

(75) Inventors: Tony Prezeau, Poisat (FR); Teddy Muller, Poisy (FR); Michel Baron, Francheville (FR); Joan Samuel, Pontcharra (FR); Emmanuel Dransart, Saint Romain les Atheux (FR)

(73) Assignee: WINOA (FR)

( * ) Notice: Subject to any disclaimer, the term of this patent is extended or adjusted under 35 U.S.C. 154(b) by 387 days.

(21) Appl. No.: 14/126,602

(22) PCT Filed: Jun. 18, 2012

(86) PCT No.: PCT/FR2012/051359
§ 371 (c)(1),
(2), (4) Date: Feb. 7, 2014

(87) PCT Pub. No.: WO2012/172270
PCT Pub. Date: Dec. 20, 2012

(65) Prior Publication Data
US 2014/0166160 A1   Jun. 19, 2014

(30) Foreign Application Priority Data

Jun. 17, 2011 (FR) ..................................... 11 55358

(51) Int. Cl.
*C23C 8/02* (2006.01)
*C23C 8/32* (2006.01)
(Continued)

(52) U.S. Cl.
CPC . *C23C 8/76* (2013.01); *B82Y 30/00* (2013.01); *C21D 7/06* (2013.01); *C23C 8/02* (2013.01);
(Continued)

(58) Field of Classification Search
CPC .............. C23C 8/02; C23C 8/32; C23C 8/38; C23C 8/76; B82Y 30/00; C21D 7/04; C21D 2201/00; C21D 2201/03; C21D 2201/004
See application file for complete search history.

(56) References Cited

U.S. PATENT DOCUMENTS

| | | | | |
|---|---|---|---|---|
| 2004/0250920 A1* | 12/2004 | Lu | ............................ | C21D 7/06 148/218 |
| 2006/0130942 A1* | 6/2006 | Ishikawa | ................... | C21D 7/04 148/558 |
| 2007/0006943 A1* | 1/2007 | Lu | ............................ | C21D 7/06 148/209 |

FOREIGN PATENT DOCUMENTS

| | | |
|---|---|---|
| CN | 101549480 A | 10/2009 |
| CN | 101580940 | * 11/2009 |

(Continued)

OTHER PUBLICATIONS

Bagheri, S., et al; Review of Shot Peening Processes to Obtain Nanocrystalline Surfaces in Metal Alloys; Surface Engineering; (2009); pp. 3-14; vol. 25; No. 1; Institute of Materials, Minerals and Mining.

(Continued)

*Primary Examiner* — Colleen Dunn
(74) *Attorney, Agent, or Firm* — Blank Rome LLP; Michael C. Greenbaum; Jaime L. Tesfazion

(57) ABSTRACT

A process for the surface treatment of a metal part comprises: exposing a surface (1) of the metal part to a stream of substantially spherical particles, so that any portion of said surface receives said particles along several primary incidences, the primary incidences of the particles on a portion of the surface being essentially distributed in a cone or a conical film which has an outer half apex angle between 10° and 45°, until a surface layer (3) of nanostructures having an average thickness of several tens of microns is obtained, the particles having a diameter of less than 2 mm and greater than 0.1 mm and being projected at a speed between 40 m/s and 100 m/s. A thermochemical treatment is then applied, in particular a low-temperature treatment of the nitriding type or a high-temperature treatment of the low-pressure carbonitriding type.

12 Claims, 17 Drawing Sheets

(51) Int. Cl.
*C23C 8/38* (2006.01)
*C21D 7/06* (2006.01)
*C23C 8/76* (2006.01)
*B82Y 30/00* (2011.01)
*C21D 7/04* (2006.01)

(52) U.S. Cl.
CPC ... *C23C 8/32* (2013.01); *C23C 8/38* (2013.01); *C21D 7/04* (2013.01); *C21D 2201/00* (2013.01); *C21D 2201/03* (2013.01); *C21D 2211/004* (2013.01)

(56) References Cited

FOREIGN PATENT DOCUMENTS

| CN | 101580940 A | | 11/2009 |
|---|---|---|---|
| EP | 1577401 | * | 9/2005 |
| EP | 1577401 A1 | | 9/2005 |
| JP | 2003-201549 A | | 7/2003 |
| WO | 02/10461 A1 | | 2/2002 |
| WO | 02/10462 A1 | | 2/2002 |
| WO | 0210463 A1 | | 2/2002 |
| WO | WO 02/10462 | * | 2/2002 |
| WO | WO 02/10463 | * | 2/2002 |

OTHER PUBLICATIONS

Todaka, Yoshikazu, et al; Formation of Surface NanoCrystalline Structure in Steels by Shot Peening and Role of Strain Gradient on Grain Refinement by Deformation; ISIJ International; (2007); pp. 157-162; vol. 47; No. 1.

Todaku, Yoshikazu, et al; Comparison of Nanocrystalline Surface Layer in Steels Formed by Air Blast and Ultrasonic Shot Peening; The Japan Institute of Metals; Materials Transactions; (2004); pp. 376-379; vol. 45; No. 2.

* cited by examiner

SURFACE TREATMENT OF A METAL PART

RELATED APPLICATION

The present application is a National Phase of PCT/FR2012/051359, filed Jun. 18, 2012, which claims the benefit of French Patent Application No. 1155358, filed Jun. 17, 2011, the entire disclosures of which are incorporated by reference herein.

The invention relates to the field of the treatment of metal surfaces, in particular to the treatment by peening, optionally combined with thermochemical treatments.

Shot peening is a technique that is widely used for improving certain properties of metal surfaces, such as the fatigue life. A shot-peening treatment is typically characterized by a degree of coverage that describes the proportion of the surface impacted by the peening and an intensity that describes the amount of kinetic energy applied per unit area. The literature in the field of shot peening prescribes limits for the degree of coverage and intensity parameters, beyond which the peened material incurs degradation such as cracking and reduction of the fatigue life. The conditions giving rise to these degradations are commonly denoted by the term "overpeening".

Subsequent research into peening treatments has highlighted the possibility of producing a nanostructuring of the material at a surface layer by pushing the peening treatment beyond the limits normally prescribed. The term "nanostructuring" denotes the obtaining of a stable phase, the grain size of which is of the order of a few tens of manometers. Under certain conditions, it is assumed that the nanostructuring of the material prevents the propagation of microcracks, so that the aforementioned degradations do not occur.

The nanostructuring of the material produces advantageous effects such as the increase of the fatigue life, of the hardness, of the corrosion resistance, of the atomic diffusivity, of the biocompatibility, the improvement of the tribological properties, etc.

Among the processes known for producing a nanostructured surface layer, note may essentially be taken of:
- techniques for projecting fine or very fine particles at high or very high speed (Fine Particle Bombarding or Air Blast Shot Peening) at normal incidence onto the sample to be treated. These techniques are especially presented in the publication of the Iron and Steel Institute of Japan, ISIJ International, Vol. 47 (2007), No. 1, pp 157-162;
- techniques for vibrating larger particles at lower speeds, known as UltraSonic Shot Peening or Surface Mechanical Attrition Treatment. These techniques are especially presented in the publication of the Japan Institute of Metals Materials Transactions, Vol. 45, No. 2 (2004), pp 376-379.

WO02/10461 describes a process for generating nanostructures at the surface of a metal part in which perfectly spherical balls similar to ball bearing balls are projected onto a point of impact of the part under variable incidences. In order to obtain a thickness of nanostructures of a few tens to a few hundreds of microns, it is taught to mechanically and/or thermally stress the surface of the metal part to be treated.

Document CN101580940A describes a tyre mould treatment method. The method comprises a step of treatment via nanocrystallization. The nanocrystallization step is carried out using a continually oscillating peening tool.

WO 02/10462 describes a process for generating nanostructures in which balls are projected onto a point of impact of a part along different and varied directions of incidence by a ball projection source in order to create deformations having any direction. The process also comprises a step of chemical treatment of the nanostructured layer at temperatures of 550° C. and 350° C.

According to one embodiment, the invention provides a process for the surface treatment of a metal part, comprising: exposing a surface of the metal part to a stream of substantially spherical particles, so that any portion of said surface receives said particles along several primary incidences, the primary incidences of the particles on a portion of the surface being essentially distributed in a cone or a conical film which has an outer half apex angle between 10° and 45°, until a surface layer of nanostructures is obtained, for example a layer having an average thickness of greater than 40 or 50 µm, the particles having a diameter of less than 2 mm and greater than 0.1 mm and being projected at a speed between 40 m/s and 100 m/s.

One idea at the heart of the invention is to create one or more streams of particles capable of hitting a surface to be treated along varied and controlled incidences in order to stress a large number of atomic slip planes of the material. According to one embodiment, the surface layer of nanostructures has an average thickness of greater than 40 or 50 µm, the boundary of the surface layer of nanostructures being determined to be a region of the metal part where the hardness is greater than a threshold that is dependent on the metal material from which the part is made.

According to one embodiment, said hardness threshold is defined by a hardening of the material with respect to a prior art upon surface treatment which is equal to 50% of the hardening obtained at the treated surface of the metal part. In other cases this threshold may be defined as a function of other parameters, especially the position of a crystalline phase transition in the material when such a transition takes place.

According to other advantageous embodiments, such a process may have one or more of the following features.

According to one embodiment, the particles have a diameter of greater than 0.3 mm and less than 1.4 mm.

According to one embodiment, the incidences of the particles are distributed substantially continuously in the cone or the conical film.

In one embodiment, the cone or the conical film has an outer half apex angle of between 10° and 30°.

According to one embodiment, the stream of particles comprises a jet of particles projected along a central direction, the metal part being fixed to a support so as to present said surface oriented obliquely with respect to said central direction, the support being rotated about an axis coaxial with the central direction of the jet of particles.

According to one embodiment, the inclination of the surface of the part with respect to the central direction is between 10° and 30°, preferably close to 15°.

According to one embodiment, the particles are projected at a speed of between 50 and 80 m/s.

According to one embodiment, the particles have a hardness greater than the hardness of the surface of the part before treatment.

According to one embodiment, the invention thus provides a metal part comprising a surface treated by the aforementioned process, said surface comprising a surface layer of nanostructures having an average thickness of greater than 40 or 50 µm, the boundary of the surface layer of nanostructures being determined to be a region of the metal part where the hardness is greater than a threshold that is dependent on the metal material from which the part is made.

According to one embodiment, said hardness threshold is defined by a hardening of the material with respect to a prior art upon surface treatment which is equal to 50% of the hardening obtained at the treated surface of the metal part.

According to one embodiment, the surface layer of nanostructures has an average thickness of greater than 100 μm.

According to one embodiment, the invention also provides a surface treatment device for a metal part, comprising:
a projection means capable of producing a stream of substantially spherical particles having a diameter of less than 2 mm and greater than 0.1 mm and thus are projected at a speed of between 40 m/s and 100 m/s,
a support capable of holding a metal part, the support comprising a surface exposed to the stream of particles, and
an actuator capable of modifying an orientation of the support with respect to the stream of particles so that the primary incidences of the particles on a surface of the support are essentially distributed in a cone or a conical film that has an outer half apex angle of between 10° and 45°.

According to one embodiment, the projection means is capable of producing a jet of particles projected along a central direction, the surface of the support being oriented obliquely with respect to said central direction, the actuator being capable of pivoting the support about an axis that is coaxial with the central direction of the jet of particles.

The above peening treatments may be followed by thermochemical processes.

According to one embodiment, the surface of the metal part is exposed to thermochemical conditions that lead to the diffusion of a substance in the metal structure of the part in order to modify the chemical composition of the metal part over at least one part of its thickness starting from the surface.

It was observed that in the above peening processes, it was possible to obtain a high density of grain boundaries emerging at the surface of the part. Owing to the nanostructuring of the material previously obtained, diffusion treatments are thus capable of enriching the metal structure with elements that are diffused more rapidly and/or over a greater depth and/or at a lower temperature than in a part without surface nanostructuring. Such a thermochemical treatment may firstly, but not solely, affect the nanostructured layer. Indeed, the nanostructured region is capable of providing particularly effective inlet channels for also affecting the underlying metal.

According to one embodiment, in which the part is made of steel, the thermochemical conditions are nitriding conditions at a temperature between 300° C. and 590° C. that lead to a diffusion of nitrogen into the grain boundaries of the steel of the surface layer of nanostructures, the process resulting in the formation of fine precipitates dispersed in this layer, for example in the form of nitride or carbonitride particles finely dispersed in the surface layer of nanostructures.

According to one embodiment, the metal part is composed of an austenitic stainless steel or of a structural steel, and the surface is exposed to the stream of particles with a degree of coverage of 1000 to 2000%.

According to one embodiment, the metal part is composed of a tool steel and the surface is exposed to the stream of particles until a nanostructured layer of at least 40 μm thick is obtained, for example by carrying out the peening with a degree of coverage of greater than 3000%.

According to one embodiment, the thermochemical conditions are low-pressure carbonitriding conditions at a temperature between 750° C. and 1100° C. that lead to a recrystallization of the surface layer of nanostructures and a diffusion of nitrogen into the grain boundaries of the steel of the recrystallized surface layer, the process producing or favouring the formation of carbonitride particles finely dispersed in the recrystallized surface layer.

According to one embodiment, the step of exposing the metal part to the thermochemical conditions comprises:
subjecting the metal part to a gradual temperature rise up to said carbonitriding temperature and
holding the temperature at said carbonitriding temperature, the combined duration of the temperature rise and of the temperature hold being less than three hours.

According to one embodiment, the combined duration is between 0.5 and 1.5 hours.

According to one embodiment, the surface is exposed to the stream of particles with a degree of coverage of between 400% and 1000%.

Similarly, other thermochemical treatments lead to the formation of precipitates having a different chemical nature, as a function of the diffused elements. In any case, the prior nanostructuring of the material favours the structuring of these precipitates in a fine and dispersed form and inhibits the formation of precipitates in a coarse form or in the form of a weakening continuous network.

Certain aspects of the invention are based on the idea of designing a process for nanostructuring the material which has a high productivity in order to produce relatively thick nanostructured surface layers in a relatively short time. Certain aspects of the invention are based on the idea of producing relatively homogeneous nanostructured surface layers. Certain aspects of the invention are based on the idea of designing a process for nanostructuring the material which can be applied to varied geometries, in particular concave shapes. Certain aspects of the invention are based on the idea of designing a process for nanostructuring the material which is relatively easy and economical to implement.

The invention will be better understood, and other objectives, details, features and advantages thereof will become more clearly apparent in the course of the following description of several particular embodiments of the invention, given solely by way of illustration and nonlimitingly, with reference to the appended drawings.

Described below are embodiments of peening processes that make it possible to obtain a nanostructured surface layer on a metal part. Unless otherwise indicated, the experimental results presented below are obtained with flat metal samples.

Figure 1:
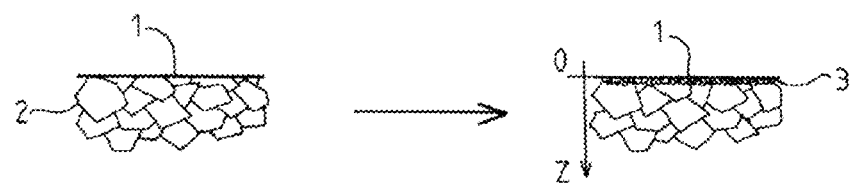
FIG. 1 is a schematic representation of a process for nanostructuring a metal surface.

With reference to FIG. 1, a process for nanostructuring a metal surface 1 is schematically represented. In the left-hand view, before treatment, the size of the grains 2 of the material all the way to the surface 1 is typically a few tens to a few hundreds of μm. In the right-hand view, after treatment, the grain size of the material at a surface layer 3 is reduced to a few tens of nm, for example around 20 nm, whilst grains of larger size continue to exist more deeply in the material. Subsequently, an axis z perpendicular to the surface 1 and oriented towards the inside of the material starting from the surface is defined. The surface serves as a reference of the dimensions. The transition of the size of the grains between the surface layer 3 and the unmodified deep material is in reality more gradual than in the drawing.

The nanostructuring of the material in the layer 3 is stable up to a temperature of at least 600° C. A metal part coated with such a nanostructured layer may be used in various industries, for example in applications where the wear resistance and the fatigue resistance are critical properties.

Figure 2:
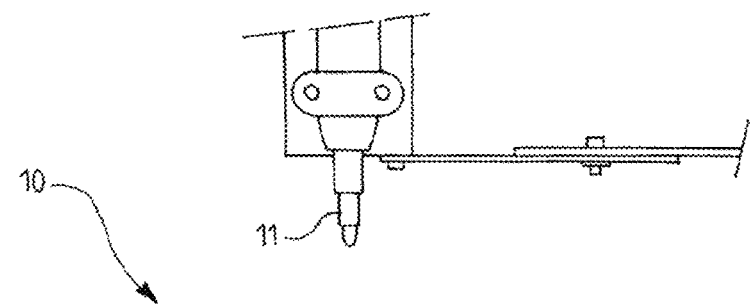
FIG. 2 is a schematic perspective view of a peening machine suitable for implementing the processes according to the embodiments of the invention.
Figure 2:
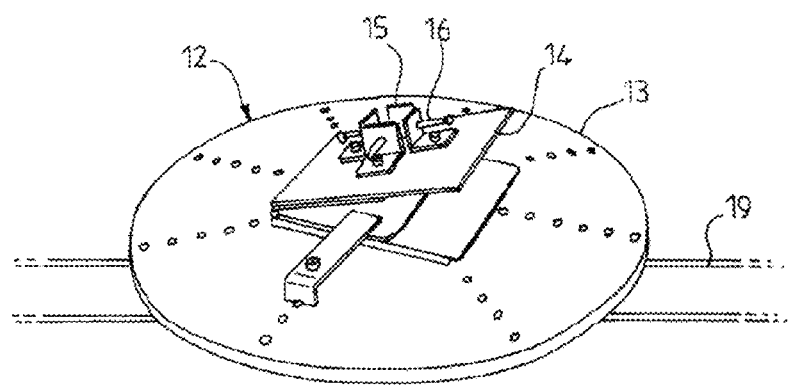

With reference to FIG. 2, a peening machine 10 which may be used to produce such a nanostructured layer is now described.

The machine 10 comprises a projection nozzle 11 supplied from a shot reservoir and from an air compressor (which are not represented) in order to produce a jet of shot projected at a speed V which may vary depending on the size of the shot particles. As a variant, the projection of the shot particles may also be carried out using a vane turbine, according to the known art. Common peening equipment makes it possible to obtain speeds ranging from 20 m/s to around 120 m/s.

The shot used preferably consists of particles obtained by atomization. Such particles may be produced in a large amount at a relatively advantageous cost and have quite good sphericity, for example greater than or equal to 85%. Their cost is substantially lower than that of ball bearing balls, the process for the manufacture of which is virtually unitary in order to achieve a sphericity of greater than 99%. Alternatively, other conventional peening media can be used, such as conditioned cut wire, glass beads or ceramic beads.

The projection nozzle 11 is fixed facing a mobile support device 12 constructed in the following manner: a metal disk 13 is mounted on the shaft of a rotary motor that is not represented, for example an electric motor, in order to be able to pivot with respect to a fixed frame 19. The central pivoting axis of the disk 13 is coaxial with a central projection axis of the nozzle 11. Positioned on the disk 13 is an inclinable support 14, the angle of inclination of which with respect to the disk 13 can be adjusted by means of a screw. Fastened around a central portion of the inclinable support 14 are fastening clamps 15 provided with screws 16 parallel to the support 14. The screws 16 may be tightened onto a part to be treated in order to fasten the part between the clamps 15 and may be loosened in order to withdraw the part after treatment.

Figures 3, 4:
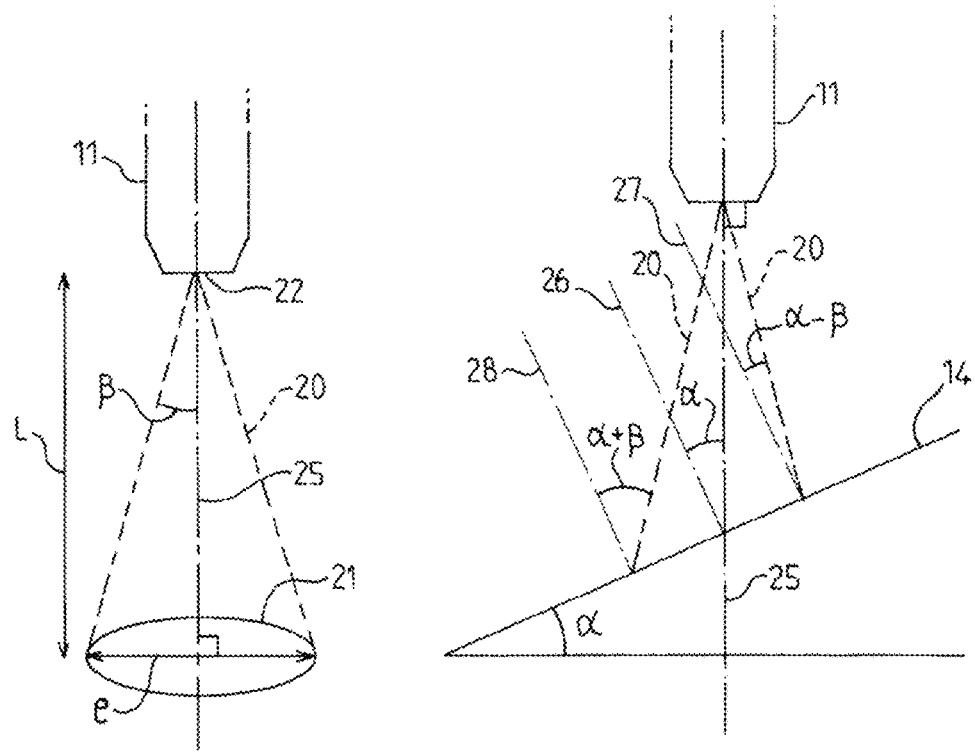
FIG. 3 is a schematic representation of a particle jet produced by the machine from FIG. 2.
FIG. 4 is a diagram of the operation of the machine from FIG. 2.

With reference to FIG. 3, a jet of particles 20 produced by the projection nozzle 11 is schematically represented. The jet 20 has an approximately conical shape with a half apex angle β. The angle β may be measured, for example, as the ratio between the radius ρ of an impacted region 21 and the distance L from the region 21 to the orifice 22 of the nozzle 11.

With reference to FIG. 4, the operating principle of the peening machine 10 is now described. For a flat sample parallel to the support 14, the surface portion located around the central axis 25 of the jet 20 receives the particles at an angle of incidence α with respect to the local normal direction 26. The surface portion located around an edge of the jet 20 receives the particles at an angle of incidence (α−β) with respect to the local normal direction 27. The surface portion located around the opposite edge of the jet 20 receives the particles at an angle of incidence (α+β) with respect to the local normal direction 28.

When the support device 12 turns during the projection of the particles, any portion of the sample located in the jet 20 is hit at incidences located in a more or less wide conical film. This conical film is thin towards the centre of the jet where it coincides exactly with the angle α and broader towards the periphery of the jet, where it includes all the angles between (α−β) and (α+β). If β≥α, the conical film degenerates into a cone. During the rotation of the support device 12, a treated surface region may be hit at all the angle of elevation values located in the conical film. This property of the machine 10 makes it possible to produce nanostructured layers on different metals with a relatively high productivity, as will be recounted in the tests below. In the tests below, the angle β is equal to around 8° and the distance L to around 300 mm. Of course, it is not excluded for a small portion of the particles to be projected along atypical trajectories outside of the main directions of the jet 20.

The tests which will be described below were carried out with various types of shot, the main properties of which are mentioned in Table 1, according to the SAE J444 standard. The nominal diameter of a type of shot is defined as the median diameter of the distribution: 50% by weight of the particles of the type of shot considered have a diameter of less than the nominal diameter, and 50% have a larger diameter.

amount. A degree of coverage of 1000% therefore indicates that ten times the reference amount has been projected. At constant flow rate, the degree of coverage is therefore also a measurement of the treatment time of the sample.

The thickness of the nanostructured layer zn was obtained by two methods: observation by optical microscopy and observation of the hardness profile of the material as a function of the depth z.

Via optical microscopy, the thickness measured is an arithmetic mean of nine observations of the thickness of the visually amorphous layer corresponding to the nanostructured region 3. The width of the sample treated is scanned over three regions and three measurements are taken per region, which ensures the reproducibility of the measurement method.

The microscope observations are then correlated to hardness profiles, in order to confirm that the visually amorphous region observed indeed corresponds to the peak of hardness originating from the hardening by the effect of the nanometer-sized grains.

The method used for producing the hardness profile consists in making an indentation line with a step of 50 μm starting from the outermost surface with a micro Vickers hardness tester having a pyramidal tip with a load of 100 g (HV 0.1) which possesses a lens. The surface of the sample and the nanostructured layer are visualized as in optical microscopy. The hardness profile is thus obtained from a depth of 50 μm to 500 μm. The values communicated are an average of three indentation lines in order to have a reliable and reproducible measurement.

Figure 5:
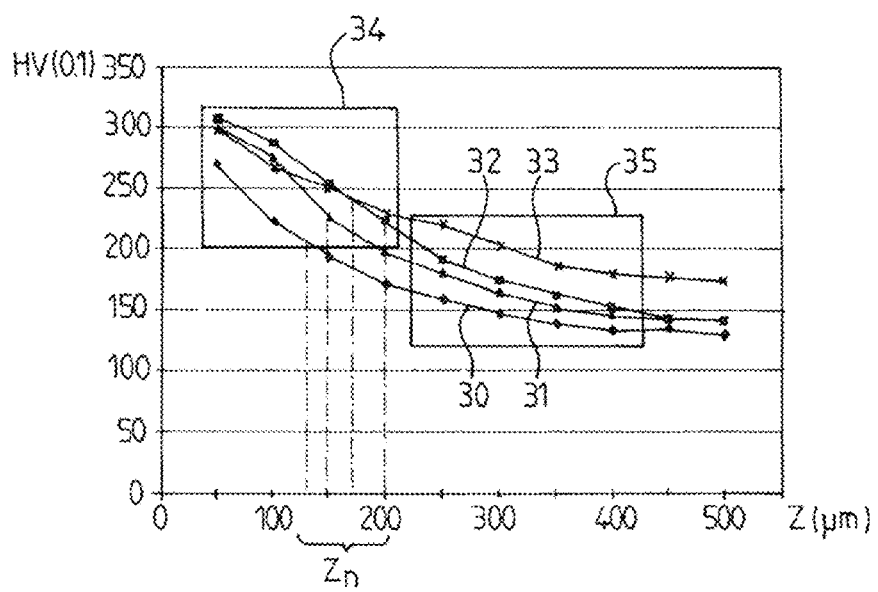
FIG. 5 is a graph representing the change in the hardness of a metal part as a function of the depth below the treated surface, for several peening conditions.

The connection between the hardness profile and the thickness $z_n$ may be explained more precisely with the aid of FIG. 5. FIG. 5 represents the hardness profiles obtained by the method explained above in test 1 samples with R=3000%. The curve 30 corresponds to the type S170 shot. The curve 31 corresponds to the type S280 shot. The curve 32 corresponds to the type S330 shot. The curve 33 corresponds to the type S550 shot. On all the curves 30 to 33, a region of very high hardness 34 appears, which corresponds to the nanostructured layer 3 and a second region 35 appears where the hardness decreases more gradually with the depth and which corresponds to the strain hardening of the material. The boundary of the nanostructured layer 3 must therefore correspond to a steep change of slope of the hardness. This point is verified in FIG. 5 where the thicknesses $z_n$ obtained by visual observation have been plotted as a dot-and-dash line for each type of shot. More specifically, for the four types of shot tested in FIG. 5, the boundary of the nanostructured layer 3 observed visually corresponds substantially to the region in which the hardness is equal to the median value between the hardness value at the surface, which is here represented by the first measurement point at a depth of 50 μm, and the hardness value far from the surface, where the material has not been

TABLE 1 properties of the shots according to the SAE J444 standard

| Type of shot | Nominal diameter (D) | Distribution (fraction of the particles of larger size than) | | | | | | | | | | | | | |
|---|---|---|---|---|---|---|---|---|---|---|---|---|---|---|---|
| | | 2.00 | 1.70 | 1.40 | 1.18 | 1.00 | 0.85 | 0.71 | 0.60 | 0.50 | .425 | 0.35 | 0.30 | 0.18 | .125 |
| S550 | 1.40 | 0 | | >85 | >96 | | | | | | | | | | |
| S330 | 0.85 | | | 0 | <5 | | >85 | >96 | | | | | | | |
| S280 | 0.71 | | | | 0 | <5 | | >85 | >96 | | | | | | |
| S170 | 0.425 | | | | | | | 0 | <10 | | >85 | >97 | | | |
| S070 | 0.18 | | | | | | | | | | 0 | <10 | | >80 | >90 |
| mm | | | | | | | | | | | | | | | |

Test 1

Table 2 recounts the results of a first test carried out with the machine 10 on flat samples of E24 steel (low-alloy steel: 0.2% C, 1.5% Mn, 98.2% Fe) fastened by clamping to the support 14 with an inclination α=15°. Recorded in this table are the type of shot used in the test, the projection speed V, the degree of coverage R, the thickness of the nanostructured layer $z_n$ obtained, the Vickers hardness of the sample on its face exposed to the peening, the Vickers hardness of the sample on its opposite face, and the ratio between the two hardnesses, known as the hardness gain.

The degree of coverage R is a measurement of the proportion of the surface impacted by the peening. In the present description, it is defined as follows: the reference 100% indicates that an amount of shot which is statistically sufficient to impact 98% of the exposed surface was projected. Beyond 100%, a linear law is applied with respect to this reference substantially affected by the peening, which is represented by the last measurement point at 500 μm.

A quantitative definition of the nanostructured layer 3 may therefore be provided as a function of the hardness curve: the nanostructured layer 3 is the region in which the hardening of the material produced by the peening treatment is greater than or equal to 50% of the maximum hardening obtained at the surface of the sample. This empirical definition has been verified experimentally for the degrees of coverage of greater than 750%, as will be explained below.

Figure 6:
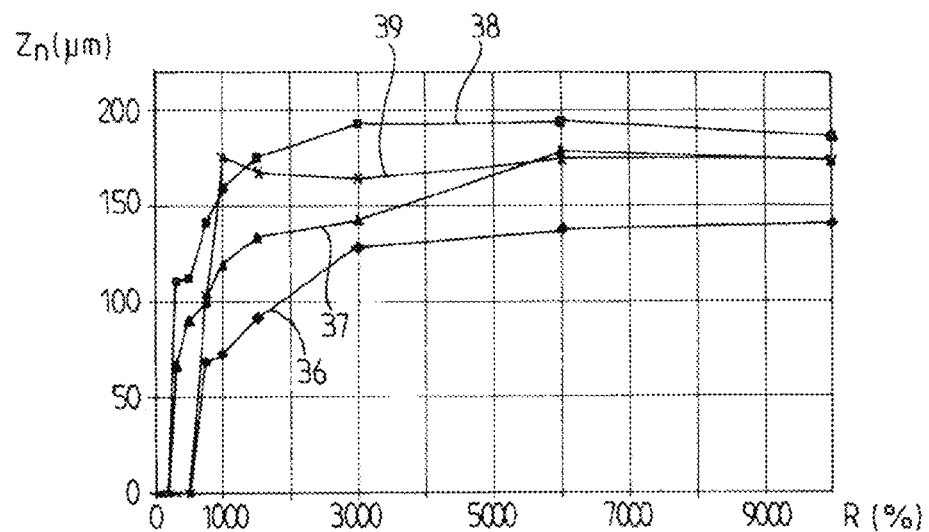
FIG. 6 is a graph representing the change in the thickness of a nanostructured surface layer as a function of the degree of coverage for the peening conditions from FIG. 5.

FIG. 6 represents the change in the thickness $z_n$ observed visually as a function of the peening treatment time, measured by the degree of coverage R, by the four types of shot. Curve 36 corresponds to type S170 shot. Curve 37 corresponds to type S280 shot. Curve 38 corresponds to type S330 shot. Curve 39 corresponds to type S550 shot. Curves 36 to 39 demonstrate a detection threshold of the nanostructured layer 3 and a saturation threshold of its thickness. In particular, it is seen that the thickness no longer changes significantly beyond the R=3000% within the context of test 1.

FIG. 6 demonstrates that all the shots from test 1 make it possible to obtain a thickness $z_n$ that exceeds 100 μm, or even 140 μm. This figure also demonstrates two advantages of the type S280 and S330 shots (curves 37 and 38). On the one hand, the nanostructured layer 3 appears significantly at a lower degree of coverage R, around 300%, than with the larger particles (S550) or smaller particles (S170). On the other hand, the thickness $z_n$ reaches its peak at a higher level than that obtained with larger particles (S550) or smaller particles (S170).

Not obtaining a maximum thickness $z_n$ with the largest particles (S550, curve 39) may be considered surprising. This observation can however be explained by the competition effect that exists, when the size of the projectiles increases, between on the one hand the increase in the kinetic energy per particle, which involves a deeper and more intense plastic deformation of the material at each particle impact, and on the other hand the increase of the mean spacing between the impacts, which involves a less even spatial distribution of the impacts.

Figure 16:
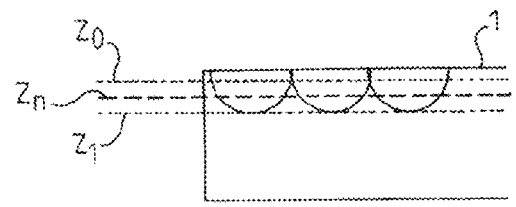
FIG. 16 is a schematic cross-sectional representation of a part treated by a peening process representing the region of influence of an impact.

This competition is illustrated schematically in FIG. 16, where the region of influence of an impact, also referred to as the nanocrystallization lobe, is represented by a semisphere. Whereas close impacts produce a thickness $z_n$ that is relatively uniform over the entire treated surface, impacts that are relatively spaced apart give rise to edge regions where the material is deformed over a relatively small thickness $z_0$ and central zones where the material is deformed over a relatively large thickness $z_1$. The thickness $z_n$ that can be observed lies between $z_0$ and $z_1$.

Figure 17:
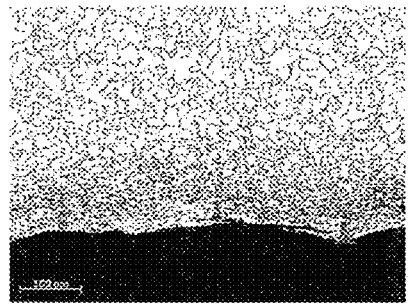
FIGS. 17 to 20 are optical micrographs of nanostructured surface layers.
Figure 17:
Figure 18:
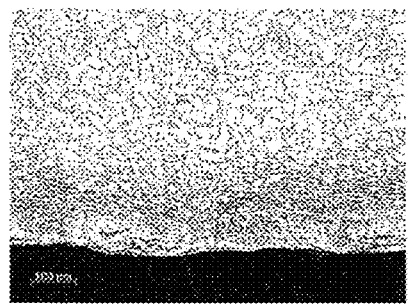
Figure 18:
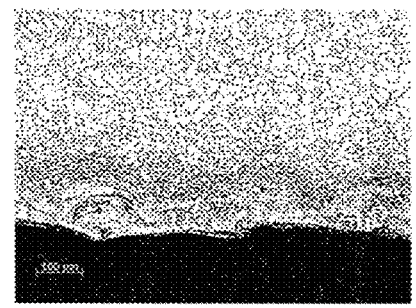
Figure 19:
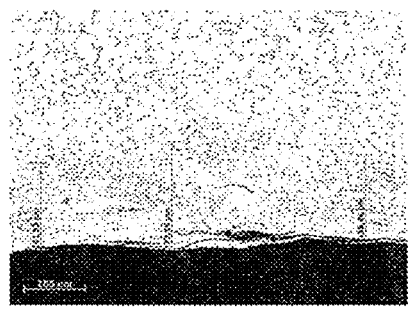
Figure 19:
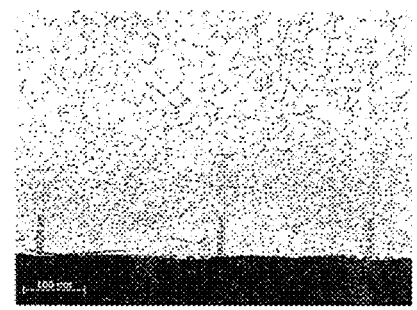
Figure 20:
Figure 20:

Another property on which the size of the particles has an observable effect is the uniformity of the thickness $z_n$ along the treated surface. This property may be characterized by the standard deviation l of the thickness $z_n$. Table 3 recounts the values measured in the samples from test 1, micrographs of which are reproduced in FIGS. 17 to 19. For the chosen degree of coverage, it appears that the largest type S550 shot provides a mean thickness $z_n$ comparable to the thickness obtained with the type S330, but a doubling of the standard deviation l. FIGS. 17 to 19 also make it possible to observe nanocrystallization lobes.

TABLE 3

Standard deviation of the nanostructured thickness in test 1

| FIG. | Type of shot | Degree of coverage R (%) | Vickers hardness at the surface (HV) | Nano thickness $z_n$ (μm) | Nano thickness standard deviation l (μm) |
|---|---|---|---|---|---|
| 17 | S170 | 1000 | 263 | 72.05 | 11.1 |
| 18 | S280 | 1000 | 290 | 119.7 | 12.5 |
| 19 | S330 | 1000 | 290 | 159.76 | 19.6 |
| 20 | S550 | 1000 | 292 | 175.5 | 40 |

Moreover, depending on the nature of the projection nozzle 11, the time needed to obtain a given degree of coverage may increase with the size of the particles.

Figure 7:
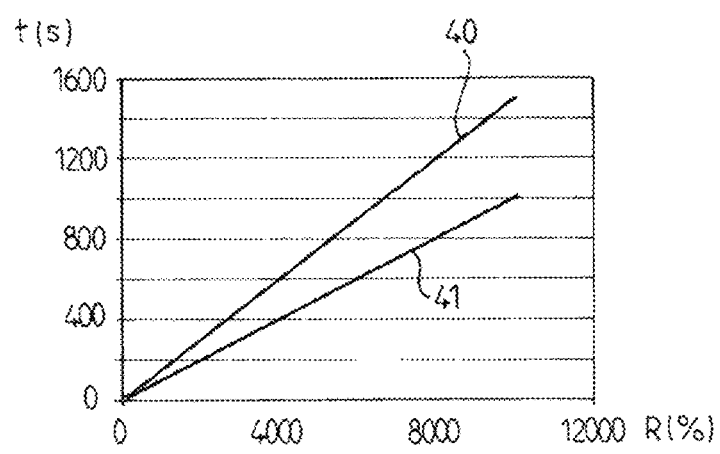
FIG. 7 is a graph representing the change in the treatment time as a function of the degree of coverage for several shot sizes.

FIG. 7 represents, for a conventional peening nozzle model, the change in the degree of coverage R with the projection time t for two different particle sizes, all conditions being otherwise equal. Curve 40 relates to type S550 and curve 41 to type S280. In test 1, in order to form a thickness of 100 μm, 107 s are needed with type S550 versus 30 s with type S330 and 75 s with type S280. It is therefore seen that the optimal type of shot in terms of productivity, that is to say that produces the greatest nanostructured thickness per unit time, lies below the S550 particle size. Test 1 therefore shows that counter-productive effects of the large particles begin to arise with the type S550 shot and that it is not advantageous to use even larger sizes.

Figure 8:
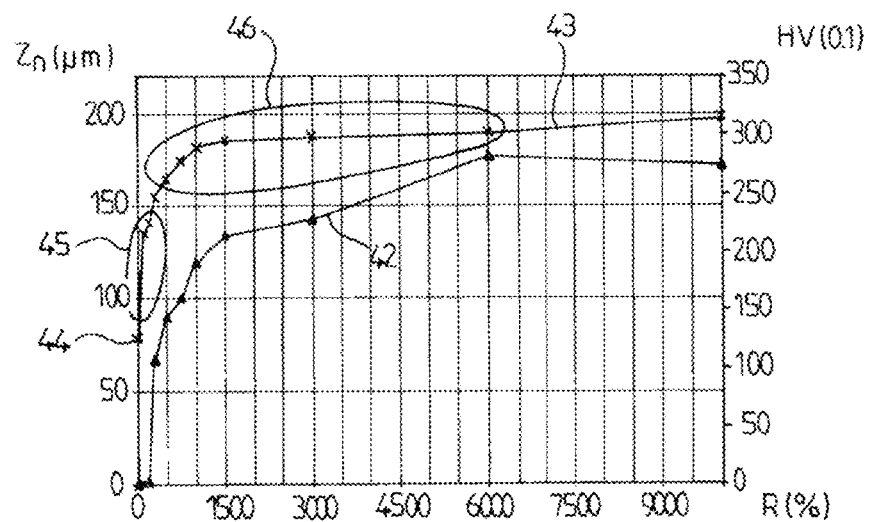
FIG. 8 is a graph representing the change in the surface hardness and in the thickness of a nanostructured surface layer as a function of the degree of coverage for a peening condition.

FIG. 8 demonstrates the relationship between the nanostructured thickness $z_n$ and the hardening observed at the surface of the treated sample. Curve 42 represents the thickness $z_n$ (left-hand axis) and the curve 43 the Vickers hardness at the surface (right-hand axis) as a function of the coverage R for type S280 in test 1. Curve 43 demonstrates a strain-hardening effect which causes a first increase in hardness in a region 45 starting from the initial hardness 44 without however forming nanometer-size grains, and an effect of the nanostructuring of the material which causes a second increase in the hardness in a region 46.

Test 2

Figure 9:
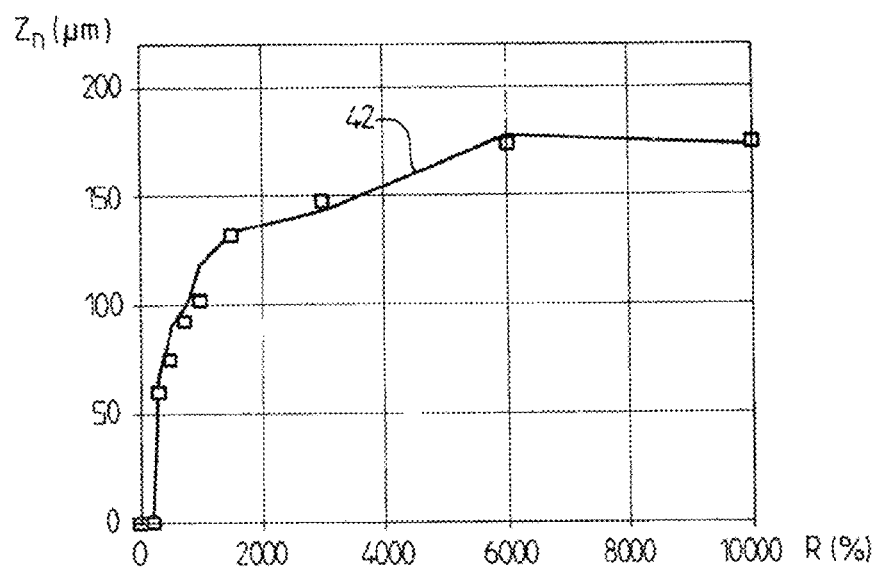
FIG. 9 is a graph representing the change in the thickness of a nanostructured surface layer as a function of the degree of coverage for various modes of attachment of the treated part.

In order to evaluate the optional effect of clamping the part by the clamps 15 in test 1, a test 2 was carried out with the type S280 shot under conditions similar to test 1 by adhesively bonding the sample to the support 14 without applying any clamping stress thereto. FIG. 9 shows the change in the thickness $z_n$ as a function of the coverage R in test 2 (square symbols) superposed on curve 42 from test 1. No significant difference emerges between the results of the two tests, neither in the thickness measurements, nor in the hardness measurements, which means that the fastening of the part by clamping in test 1 has no causal relationship with the nanostructuring effects observed.

Test 3

In order to evaluate the effect of orienting the part to be treated with respect to the jet of shot, a test 3 was carried out with the type S170, S280 and S330 shots under conditions similar to test 1 by varying the angle α between 0° and 45° and the rotation of the support device 12. The nanostructured thicknesses obtained in this test 3 are recorded in Table 4.

TABLE 4 nanostructured thickness in test 3 for R = 3000%

| Rotation | | α (°) | | | |
|---|---|---|---|---|---|
| | | 0 | 15 | 30 | 45 |
| Without | S170 | 0 | 97 | 92 | 72 | $z_n$ (μm)
| With | | 0 | 130 | 102 | 105 |
| Without | S280 | 131 | 156 | 134 | 153 |
| With | | 133 | 189 | 171 | 160 |
| Without | S330 | 111 | 168 | 134 | 144 |
| With | | 116 | 236 | 183 | 125 |

It is observed for each type of shot that the thickness $z_n$ varies with the angle α in order to reach a peak very clearly at around α=15°. It is also observed that the rotation of the support does not produce any significant effect for α=0° but substantially increases the thickness $z_n$ when the support is inclined. These observations show that the production of impacts of the particles at incidences varied at any point of the treated surface substantially increases the productivity of the nanostructuring process. In particular, these instances are distributed in a cone or a conical film which has an outer half apex angle of between around 10° and 45° within the context of this test.

Figure 10:
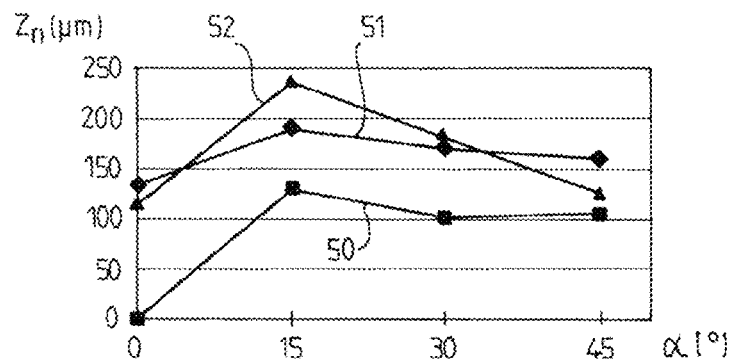
FIG. 10 is a graph representing the change in the thickness of a nanostructured surface layer as a function of the inclination of a support in the machine from FIG. 2, for several peening conditions.

FIG. 10 graphically represents the results from Table 4 with rotation of the support. Curve 50 corresponds to type S170 shot. Curve 51 corresponds to type S280 shot. Curve 52 corresponds to type S330 shot.

In order to evaluate the effect of the nature of the treated material on the nanostructuring process, other tests were carried out with different materials. In theory, different materials have a different receptivity to severe plastic deformation and therefore to nanocrystallization mechanisms. The grain refinement procedures under severe plastic deformation depend on many intrinsic and extrinsic factors, such as the structure and the stacking fault energy (SFE) of the material. The higher the SFE energy of the material, for example such as pure iron, the more difficult the activation of the various slip planes and the generation of dislocations necessary for the grain requirement procedures are made. The crystallographic structure of the metal and the optional presence of other elements such as carbon or other alloy elements, especially in the form of precipitates that favour the formation of dislocations, therefore have an influence on the productivity of the nanostructuring process.

Test 4

Figure 11:
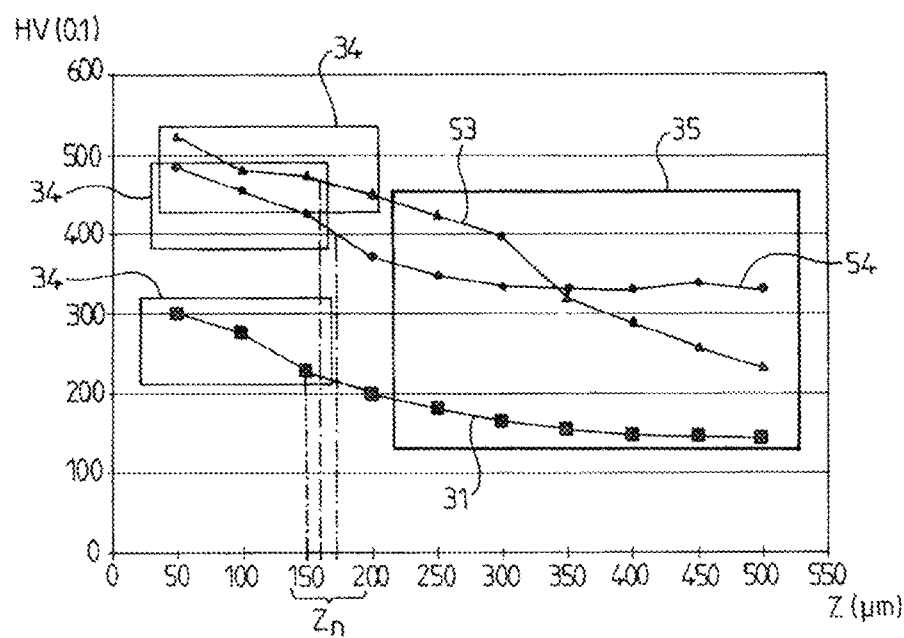
FIG. 11 is a graph representing the change in the hardness of parts made of various metal materials as a function of the depth below the treated surface.

A comparative test was carried out with samples of 304L stainless steel and a 32CrMoV13 structural steel under conditions similar to test 1 with type S280 shot. FIG. 11 illustrates the results of these tests in terms of hardness profile for R=3000% in a representation analogous to FIG. 5. Curve 53 corresponds to the 304L stainless steel. Curve 54 corresponds to the 32CrMoV13 structural steel. The hardness profiles of these materials correspond to the trends observed in test 1. Regions 34 and 35 of FIG. 11 have the same meaning as in FIG. 5. Curve 31 from test 1 (E24 steel) is plotted by way of comparison. The thicknesses $z_n$ observed are visually 143 μm for E24, 176 μm for 32CrMoV13 structural steel and 155 μm for 304L stainless steel.

Once again, the validity of the empirical quantitative definition given above for curves 54 and 31 is observed.

This definition clearly corresponds to curve 53 (304L steel) when the reference for the hardening is chosen at a depth of 300 μm. The choice of reference is explained by the change of microstructure specific to the 304L steel, during the peening of the material, and more particularly during a first step of the peening corresponding to a step of strain-hardening of the material.

During the first step of the peening of the material, a certain amount of austenite of the 304L steel is converted to strain-induced martensite. This conversion to strain-induced martensite gives rise to a significant increase in the hardness. On curve 53, a significant reduction in the hardness is visible between 300 and 350 μm. This reduction in the hardness corresponds on the whole to the austenitic phase transition zone and the phase having a high content of strain-induced martensite. In a second step, the nanostructured layer 3 appears in the martensitic phase. Thus, starting from a thickness of greater than 350 μm, the sample of 304L steel has its original hardness of the austenite and for a thickness of less than 300 μm the hardness of the material is increased both by the nanostructured layer and by the presence of strain-induced martensite. Thus, the reference hardness used for determining the nanostructured layer is the hardness at the deepest layers of the strain-induced martensite, which is here around 300 μm.

Test 5

Figure 12:
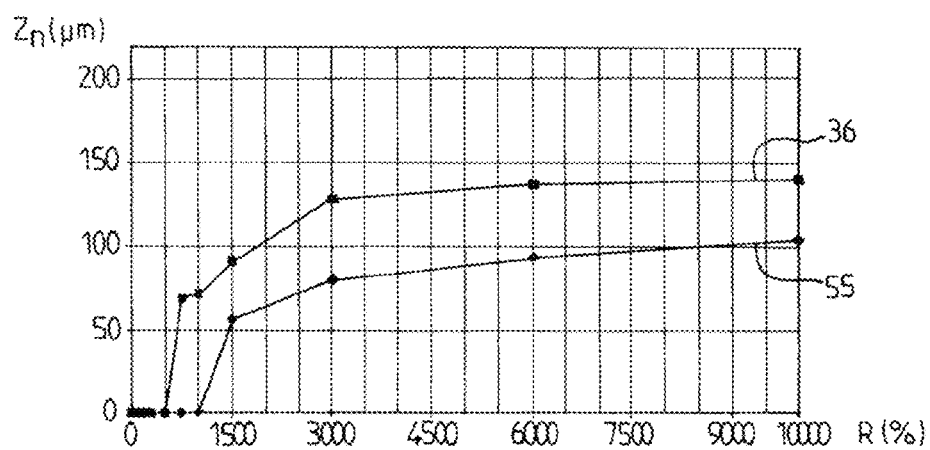
FIG. 12 is a graph representing the change in the thickness of a nanostructured surface layer as a function of the degree of coverage for various metal materials.

A comparative test was carried out with samples of pure iron containing 0.03C (99.8% Fe) under conditions similar to test 1 with type S170 shot. The pure iron is assumed to be one of the least favourable materials for grain refinement due to its ferritic structure and its high SFE energy (around 200 mJ/m²). Curve 55 from FIG. 12 represents the thickness $z_n$ resulting from this test, observed visually, as a function of the degree of coverage R. Curve 36 from test 1 (E24 steel) is plotted by way of comparison.

It is thus confirmed that the E24 steel nanocrystallizes more rapidly (appearance of the nanostructured layer at R=750%) than pure iron (appearance of the nanostructured layer at R=1000%) and has a thicker nanostructured layer ($z_n$=130 μm versus $z_n$=100 μm) at saturation. Test 5 shows that the process makes it possible to obtain nanostructured layers thicker than 100 μm for most of the materials that can be envisaged.

Test 6

In order to evaluate the effect of smaller particles, tests were carried out with samples of pure iron containing 0.03C (99.8% Fe) and type S070 shots. The other conditions are similar to test 1.

Figure 13:
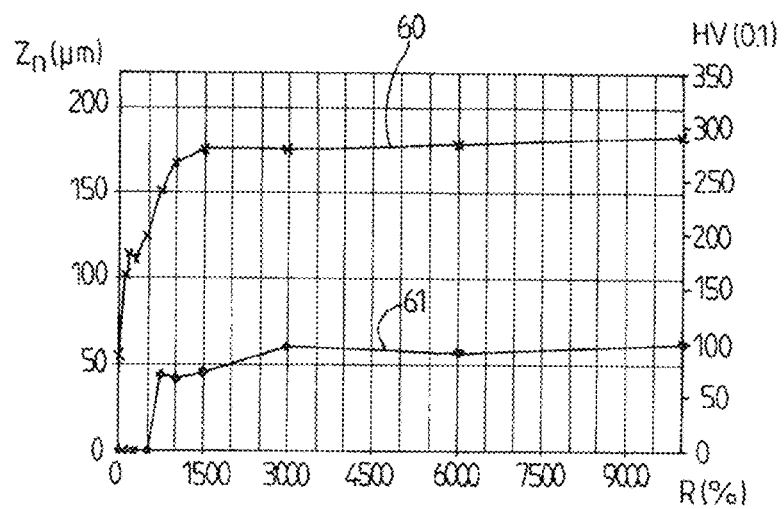
FIGS. 13 and 14 are graphs representing the change in the surface hardness and in the thickness of a nanostructured surface layer as a function of the degree of coverage for two different rates of projection.

FIG. 13 illustrates the results obtained with a projection speed V=60 m/s in a representation similar to FIG. 8. Curve 60 represents the Vickers hardness at the surface and curve 61 the thickness $z_n$ observed visually. It is observed that the thickness $z_n$ saturates at a level close to 60 μm from R=3000% onwards. With small particles such as type S070, this degree of coverage may be rapidly achieved, for example in less than 300 s with a common peening material.

Figure 14:
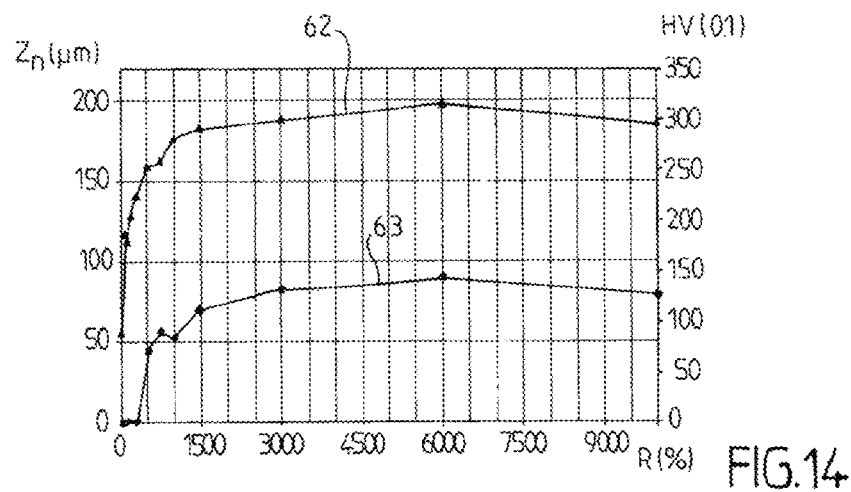

FIG. 14 illustrates the results obtained with a projection speed V=92 m/s in a representation similar to FIG. 8. Curve 62 represents the Vickers hardness at the surface and curve 63 the thickness $z_n$. It is observed that the thickness $z_n$ saturates at a level close to 80 to 90 μm from R=3000% onwards.

Test 8

A second series of tests will now be described. In this second series of tests, the hardness profiles of samples were measured with a more precise method in order to provide a definition of the nanostructured layer based solely on the hardness curve of the material.

Table 10 recounts the results of the second series of tests carried out according to the same conditions as test 1 presented in Table 2.

The method used for producing the hardness profile during this second series of tests consists in making an indentation line with a step of 10 µm starting from 20 µm from the outermost surface to a depth of 100 µm. The indentation line is then continued with a step of 50 µm to a depth of 300 µm. The indentation line is made with a micro Vickers hardness tester having a pyramidal tip with a load of 25 g (HV 0.025) which possesses a lens. It is a Buehler Micromet 5104 microhardness tester comprising a motorized table having a step of 1 µm and Buehler Omnimet Mhtsa control and measurement software. The hardness profile is thus obtained from a depth of 20 µm to 300 µm. The values communicated are an average of three indentation lines in order to have a reliable and reproducible measurement. In the same way as in the preceding tests, the surface of the samples and the nanostructured layer are visualized by optical microscopy. The observation of the samples is carried out using a Zeiss axio scope A1 microscope, a Qimaging Micropublisher 5.0 RTV camera, a Zeiss EC EPIPLAN X10/0.2HD lens and Axiovision 4.8 software.

The first three columns of Table 10 correspond to the first three columns of Table 2. The fourth column mentions the thickness of the nanostructured layer, denoted by $z_{nh}$ with reference to the hardness. Indeed, in test 8, the thickness of the nanostructured layer $z_{nh}$ was obtained by a method solely based on the hardness profile as a function of the depth z. For this, a hardness threshold is determined by calculating the median value of the hardness between the hardness measured on the surface layer and the hardness of the sample in the deep layer in which the material is not substantially modified by the peening.

The thickness of the nanostructured layer $z_{nh}$ therefore corresponds to the depth at which the increase in the hardness is equal to half of the increase in hardness observed at the surface of the sample after treating this surface.

The fifth and sixth columns mention the hardness at the surface of the sample on the treated face and on the untreated face. These values correspond to the first measurement points of the measured hardness curve, that is to say to a depth of 20 µm. On the whole, the hardness is measured closer to the surface than in test 1, so that the hardness value is higher than in Table 2. Indeed, the size of the grains in the vicinity of the surface varies according to a gradient. Thus, in one outermost surface region, the size of the grains varies between 10 and 50 nm, and in a deeper region, the size of the grains varies between a few tens of manometers to a few hundreds of manometers. Furthermore, the hardness is measured with a larger load in test 1 than in the second series of tests. The impression made in the material therefore has larger dimensions in test 1 and therefore generates a less precise measurement.

The last column from Table 10 mentions the uncertainty margin of the thickness measurement $z_{nh}$ resulting from the uncertainty margin of the microhardness tester. Indeed, the hardness measurements have an uncertainty of around ±10 Vickers for the E24 steel, ±9.5 Vickers for the 32CrMoV13 steel and ±13.5 Vickers for the 304L steel. For better accuracy of the hardness measurement, the hardness tester load is adapted as a function of the hardness of the material: a greater load is used for harder materials. Thus, a load of 50 g (HV 0.050) is used for the 32CrMoV13 steel and for the 304L steel.

Figure 31:
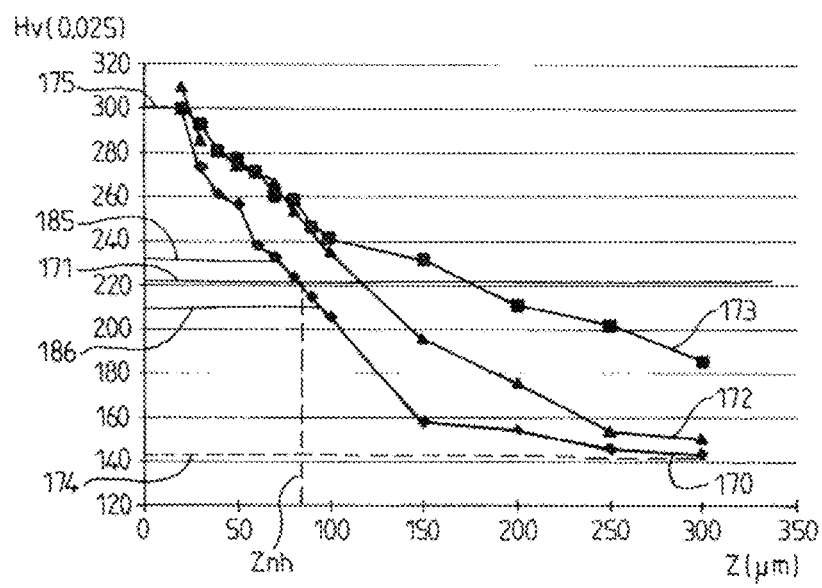
FIG. 31 is a graph representing the change in the hardness of a metal part as a function of the depth below the treated surface, for several peening conditions with another hardness measurement method.

FIG. 31 represents the hardness profiles obtained by the method explained above for the samples corresponding to the samples from test 1 with R=3000%. Curve 170 corresponds to type S170 shot. Curve 172 corresponds to type S330 shot. Curve 173 corresponds to type S550 shot. On all the curves 170, 171 and 173, a zone of very high hardness appears which corresponds to the nanostructured layer 3 and a second zone appears where the hardness decreases more gradually with the depth and which corresponds to the strain hardening of the material.

By way of example, in FIG. 31, the hardness value 174 measured in the deep layer and the maximum hardness value 175 measured on the surface layer of the sample associated with curve 170 are respectively equal to 142 and 300 Vickers. The corresponding threshold 171 has a value of 221 Vickers, which corresponds to the median value between the hardness value 174 measured in the deep layer of the sample and the maximum hardness value 175 measured on the surface layer of the sample.

This threshold makes it possible to determine a thickness $z_{nh}$ of the nanostructured layer having a value approximately equal to 81.5 µm for the test corresponding to the S170 shot.

An uncertainty range of the thickness $z_{nh}$ of the nanostructured layer is therefore determined from the hardness threshold and from the uncertainty range of the hardness. By way of example, for the threshold 171 of 221 Vickers presented previously, the boundary values of the thickness of the nanostructured layer are plotted for hardness values 185 and 186 respectively of 231 Vickers and 211 Vickers. Thus, the thickness of the nanostructured layer lies within a range of around 69 to 92 µm. The uncertainty ranges of the thickness of the nanostructured layer are presented in Table 10. Thus, due to the uncertainty of the hardness, the thickness of the nanostructured layer measured graphically itself also has a measurable uncertainty.

Figure 32:
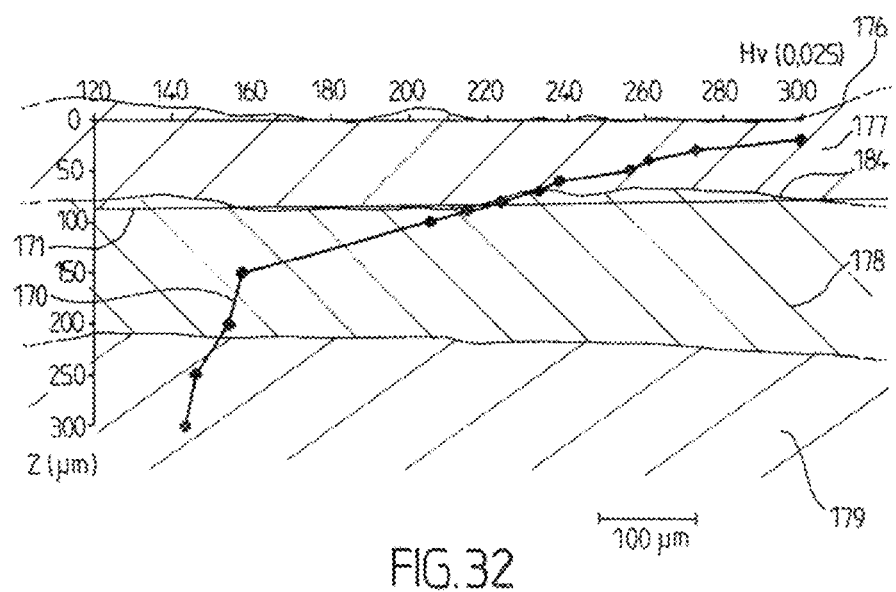
FIG. 32 is a schematic cross-sectional representation of a metal part having a nanostructured surface layer as a function of the depth below the treated surface on which the measured hardness curve is superposed.

As indicated previously, the second measurement method based on the hardness agrees satisfactorily with the visual determination method: FIG. 32 schematically represents the regions observed on the optical micrographs of the sample corresponding to curve 170 from FIG. 31 (S170 peening at R=3000%). The hardness profile 170 as a function of the depth z from the surface of the sample is plotted on the schematic representation of these regions.

Observed in FIG. 32 is a nanostructured surface layer 177 corresponding to a region in which the material is substantially amorphous and homogeneous. Layer 177 corresponds to the darker zone observed in FIGS. 17 to 19. Layer 177 extends from the surface 176 of the part to a second layer 178. This second layer 178 corresponds to the region in which grain boundaries are observed and in which the size of the grains delimited by the grain boundaries increases with the depth. On the optical micrographs, layer 178 corresponds to the region which extends from a sudden change in contrast starting from layer 177. This second layer 178 corresponds to the strain-hardening region of the material. A third layer 179 comprises a region where the size of the grains remains constant. The hardness threshold 171 agrees substantially with the boundary 184 observed visually between the nanostructured surface layer 177 and the layer 178.

The difference between the thickness values $z_n$ observed visually listed in Table 2 and the thickness values $z_{nh}$ listed in Table 10 originate essentially from the relatively high uncertainty margin of the measurements mentioned in Table 2 typically of the order of ±30 µm. In reality, the visual observations listed in Table 2 encompass a portion of the transition layer 178, which explains the higher thickness values.

Figure 33:
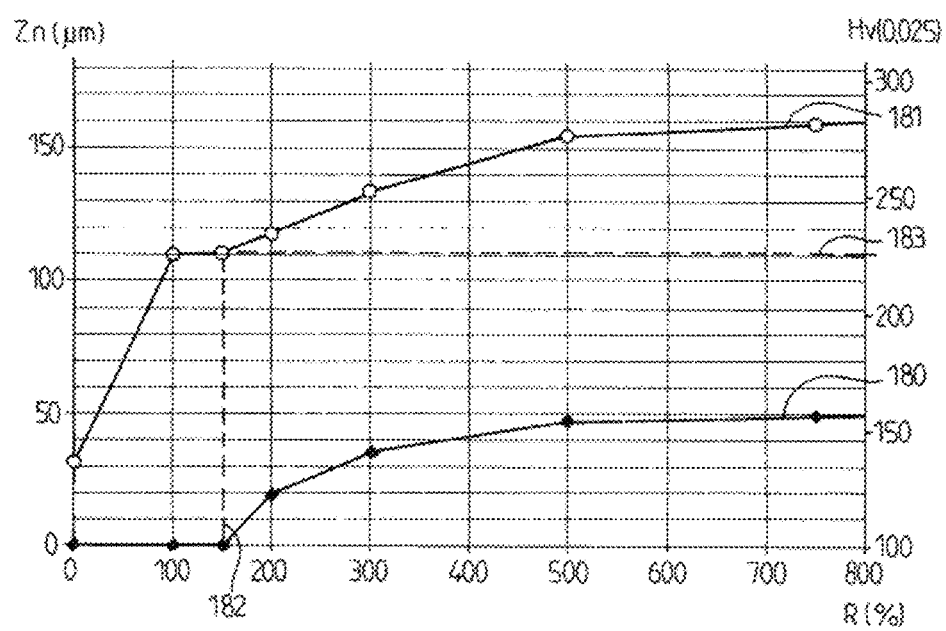
FIG. 33 is a graph representing the change in the surface hardness of a part treated by peening and the change in the thickness of a nanostructured surface layer as a function of the degree of coverage.

The method of measuring thickness based on the hardness described above may display a difference with the optical observation when the thickness of the nanostructured layer is thin, which corresponds to the case of the samples from test 8 at a degree of coverage of less than 750%. Another method for determining the thickness of the nanostructured layer may then be used. This other method is also based on the principle of determining the thickness of the nanostructured layer from a hardness threshold. This method starts from the observation that, when it appears on the sample and therefore when it has a very thin thickness, the nanostructured layer 3 has a hardness value at the surface which corresponds to this threshold. By way of illustration, with reference to FIG. 33, curve 180 represents the thickness of the nanostructured layer as a function of the coverage and curve 181 represents the surface hardness of the sample as a function of the coverage for the S170 peening test. A minimum detectable thickness 182 of the nanostructured layer appears for a coverage of 150%. However, the surface hardness 183 measured during this appearance of the nanostructured layer is 226 Vickers. This hardness threshold of 226 constitutes a realistic value of the hardness threshold for determining the thickness of the nanostructured layer after treatment with a coverage of less than 750%. This alternative value has a value close to the hardness threshold determined with the aid of the median value at R=3000% (221 Vickers). In test 8 listed in Table 10, the hardness thresholds were determined with this other method for coverage values of less than 750%. In Table 10, the values determined with this other method have an asterisk.

These results should be compared with those presented in FIG. 4 of the International ISIJ publication cited above, where the Fe-3.3Si alloy used has a ferritic crystalline structure comparable to Fe-0.03C. Test 6 demonstrates the obtaining of a greater nanostructured thickness with a degree of coverage, a particle size and a projection speed that are all lower than in this publication. It is noted that the comparison of degrees of coverage requires a calibration due to different definitions in the two cases. The use of a lower projection speed may prove advantageous for reducing the roughness of the treated sample or protecting a material more vulnerable to microcracks.

Test 7

Test 7 was carried out with samples of pure iron containing 0.03C (99.8% Fe) and type S170 shots. The other conditions are similar to test 1.

Figure 15:
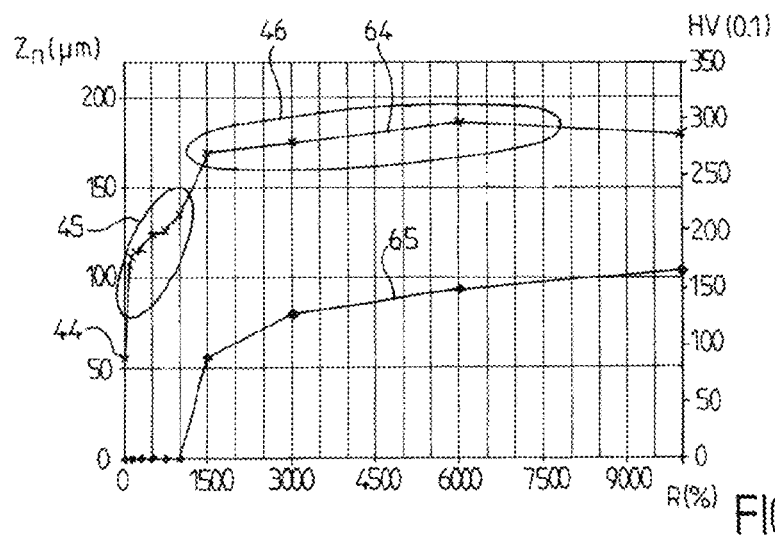
FIG. 15 is a graph representing the change in the surface hardness and in the thickness of a nanostructured surface layer as a function of the degree of coverage for another peening condition.

FIG. 15 illustrates the results obtained with a projection speed V=57 m/s in a representation similar to FIG. 8. Curve 64 represents the Vickers hardness at the surface and curve 65 the thickness $z_n$. The numbers 44, 45 and 46 have the same meaning as in FIG. 8. It is observed that the thickness $z_n$ saturates at a level close to 100 µm.

These results should be compared with those presented in FIGS. 3(a) and 4(b) of the Materials Transactions publication cited above. In particular, much greater thicknesses are obtained in a much shorter time and with a much more flexible process than ultrasonic shot peening (USSP) for the same shot size.

Although the results presented above are obtained with flat metal samples, the processes used are applicable to metal parts of any shape. In particular, in order to treat a non-planar surface, it is possible to successively treat limited portions of the non-planar surface, by each time orienting the treated surface portion so that the angle conditions described previously with reference to the flat surface are approximately respected for each successive portion of the non-planar surface. The expression "successive portion" is understood here to mean a surface portion that is relatively small with respect to the local radius of curvature, so that an average orientation of the surface portion can be defined, and relatively large with respect to the size of the shots projected, so that a large number of impacts can statistically be envisaged.

Certain non-planar geometries are capable of producing multiple impacts by one and the same particle on the part, that is to say rebounds. However, given that the rebounds lead to very high energy losses, it is assumed that it is the primary incidence of the particle, that is to say the incidence before the first impact on the part which is the most significant.

If it is not desired nor even possible to carry out the aforementioned orientation conditions for each surface portion of the part to be treated, it is preferable to identify the portions of the metal part intended to be the most stressed in its final use, that will be referred to as the working surfaces of the part. For example, the working surfaces of a gear pinion are generally the bases of the teeth. The nanostructuring treatment of a pinion can therefore be carried out, in one particular embodiment, by successively orienting the tooth base surfaces facing the particle jet, so as to carry out the particular orientation of the primary incidences of the particles on the tooth base surface.

A single projection nozzle has been presented in the embodiment of the machine from FIG. 2. However, it is also possible to conceive a peening machine with several projection nozzles. These projection nozzles may especially be arranged so as to target the same surface of the part along several different incidences. Projection nozzles may also be arranged so as to target various surfaces of the part to be treated.

Other relative arrangements of the projection nozzles and of the support of the part can be envisaged in order to produce primary incidences of the particles which are distributed in a cone or a conical film having an outer half apex angle between 10° and 45°. In particular, a displacement may be carried out at the projection nozzles.

Combination of Peening with Thermochemical Processes

The nanostructuring processes described previously may be combined with thermochemical treatments in order to modify, by diffusion, the chemical composition of the surface layers of the metallic materials and give them particular mechanical, physical and chemical properties, for example so as to improve the wear resistance, the fatigue resistance, the high-temperature or low-temperature oxidation resistance, or the corrosion resistance. In this case, the surface chemical modification does not impair the chemical composition of the core of the metal. The surface chemical modification may be combined with a heat treatment. The choice of the element diffused and of the heat treatment depends on the properties desired at the surface and in the core.

The main thermochemical treatments that can be used for this purpose are mentioned in Table 9 below.

TABLE 9

Main thermochemical treatments

| CHEMICAL SYSTEM | NAME | DESIRED RESISTANCES |
|---|---|---|
| Fe—N | Nitriding | Friction (wear) - corrosion fatigue |
| Fe—C | Carburizing | Friction (wear) - contact fatigue under high loads |
| Fe—C—N | Carbonitriding | Friction (wear) - contact fatigue under moderate load |
| Fe—S | Sulphurizing | Friction (seizing) |
| Fe—S—N | Sulphonitriding | Friction (seizing - wear) - corrosion-fatigue |
| Fe—C—N—S | Sulphocarbonitriding | Friction (seizing - wear) - corrosion-fatigue |
| Fe—B | Boriding | Friction (wear) |
| Fe—Al | Aluminizing | High-temperature oxidation |
| Fe—Cr | Chromizing | Abrasion - oxidation |
| Fe—Cr—Al | Chromoaluminizing | Abrasion - high-temperature oxidation |
| Fe—Si | Siliconizing | Acid resistance |

Due to the prior application of the nanostructuring treatment, it is useful to distinguish between thermochemical treatments that may be carried out without a substantial recrystallization taking place in the nanostructured phase, that is to say typically the treatments at relatively low temperatures, and thermochemical treatments which cause a substantial recrystallization of the nanostructured phase, that is to say typically the treatments at relatively high temperatures.

Low-Temperature Treatments

In the thermochemical treatments in which the temperature does not exceed around 590° C. for steel, the grain size in the nanostructured layer does not change substantially during the diffusion process. The nanostructuring of the material has the effect of multiplying the grain boundaries which emerge at the outer surface of the part and which thus favour the diffusion process. It is thus observed that a diffusion process carried out after a nanostructuring peening has a higher effectiveness in terms of kinetics and diffusion depth than in the absence of nanostructures. Furthermore, the nanostructuring limits the size and the connectivity of the grain boundaries, so that precipitation phenomena, in particular precipitation of carbonitrides, are inhibited in the nanostructured layer.

Nitriding tests recounted below in connection with Table 6 illustrate these points.

Test 8.1

A flat sample of 304L stainless steel is used. The nitriding is carried out in a plasma furnace over a hold of 100 h at 350° C.

On the part nitrided without peening, a layer of nitrogen austenite having a thickness of 3 to 5 microns is formed. On the part nitrided with peening, a nitrogen-enriched nanostructured dark layer of mixed martensite/austenite structure is observed between a depth of 4 and 10 microns.

The Vickers hardness was measured at the surface of the part under a load of 25 and 50 g. It is increased by around 30% by the prior peening treatment and may reach around 1000 HV.

Figure 21:
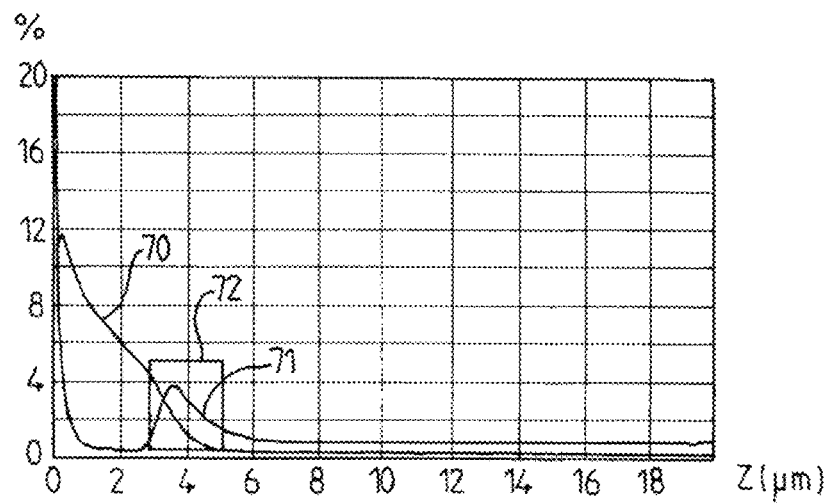
FIG. 21 is a graph representing the diffusion profile of carbon and of nitrogen in a part treated by a nitriding process without prior peening.
Figure 22:
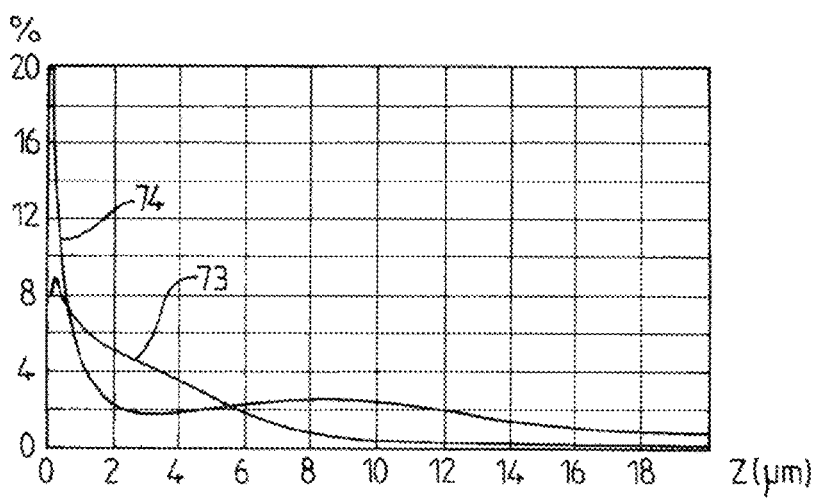
FIG. 22 is a graph representing the diffusion profile of carbon and of nitrogen in a part treated successively by a peening process and the nitriding process from FIG. 21.

FIGS. 21 and 22 represent the concentration (mass fraction) of nitrogen and of carbon as a function of the depth respectively for a part nitrided without prior peening (curves 70 and 71) and for a part successively peened and nitrided (curves 73 and 74).

Without peening treatment, the diffusion stops around 5 microns with a nitrogen content of 0.06%. The nitrogen content at the surface is around 11%. The presence of a carbon-enriched sublayer 72 is also observed at the nitrogen diffusion front, at around a depth of 5 microns.

With the prior peening treatment, the nitrogen diffusion is deeper. The degree of enrichment at the surface is around 9%. The carbon-enriched sublayer is attenuated by the peening treatment, hence a more continuous carbon concentration profile results.

Test 8.2

A flat sample of 304L stainless steel is used. The nitriding is carried out in a plasma furnace over a hold of 100 h at 400° C.

The increase in temperature favours the diffusion of nitrogen to greater depths. On the part without peening, an even white layer mainly consisting of nitrogen austenite is formed at a depth of 8 to 10 microns. The peened part is characterized by a nanostructured dark layer having a depth of 8 to 15 microns. The enrichment depth increase may range up to 50% owing to the prior peening.

The gain in hardening effect is at least 15% with respect to the nitriding treatment without prior peening: the Vickers hardness measured at the surface tends towards 1300 HV, versus around 1150 HV without prior peening.

Furthermore, the same phenomena as in test 8.1 are observed, that is to say a more continuous carbon profile with the peening treatment.

For type 304L, 304, 316 or 316L austenitic stainless steels, the hardening occurs in particular by the reduction of grain size and by the partial or total conversion of the austenite to martensite known as strain-induced martensite. However, the formation of strain-induced martensite tends to greatly reduce the corrosion resistance properties of these steels. Thus, a peening with too high a coverage on such a material reduces the corrosion resistance properties of the material. The inventors have therefore observed that a coverage between 1000 and 2000% for steels of this type presents the best compromise in order to benefit from the hardening effect without greatly degrading the anti-corrosion properties.

Test 9.1

A flat sample of 32CrMoV13 structural steel quenched-tempered at around 600° C. is used.

On the part nitrided at 480° C. without peening treatment, the presence of a thin homogeneous white layer of iron nitride having a thickness of 1 to 2 microns is observed. Many carbonitride network precipitates are present in the diffusion layer. When the concentration of nitrogen increases, these precipitates tend to form a relatively continuous layer which constitutes a region of brittleness of the part and which favours spalling of the surface.

On the part nitrided at 480° C. with nanostructuring, there is a start of growth of a white layer having a thickness of 1 to 3 microns. In the nanostructured layer, the diffusion of nitrogen is not accompanied by the visible appearance of networks of nitrides or carbonitrides.

This hardness at the surface is increased by around 15% owing to the prior peening treatment with respect to nitriding alone.

Test 9.2

A flat sample of 32CrMoV13 structural steel quenched-tempered at around 600° C. is used.

Figure 25:
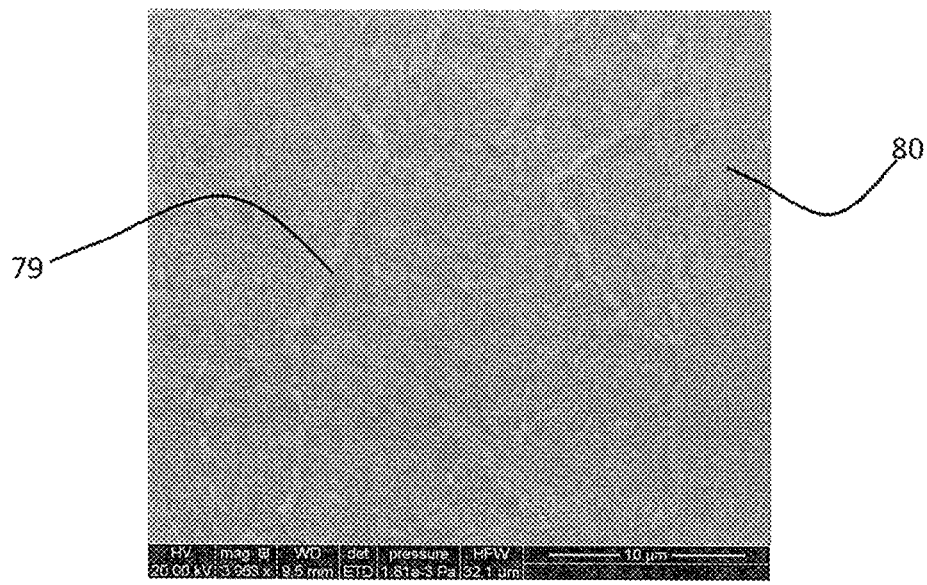
FIGS. 25 and 26 are electron microscopy images showing the cross section of a sample of structural steel 32CrMoV13 in the vicinity of its surface, for a gaseous nitriding treatment at 520° C. without and with prior nanostructuring.

FIG. 25 is an electron microscopy image showing the cross section of the sample in the vicinity of its surface, for a gaseous nitriding treatment at 520° C. without prior nanostructuring. Without prior peening, the presence of a sublayer is observed in the lower part of the white layer 80 at the interface with the diffusion layer which is seriously enriched in carbon (0.6%). This favours the development of connected, and therefore embrittling, carbonitride networks visible at the number 79.

Figure 26:
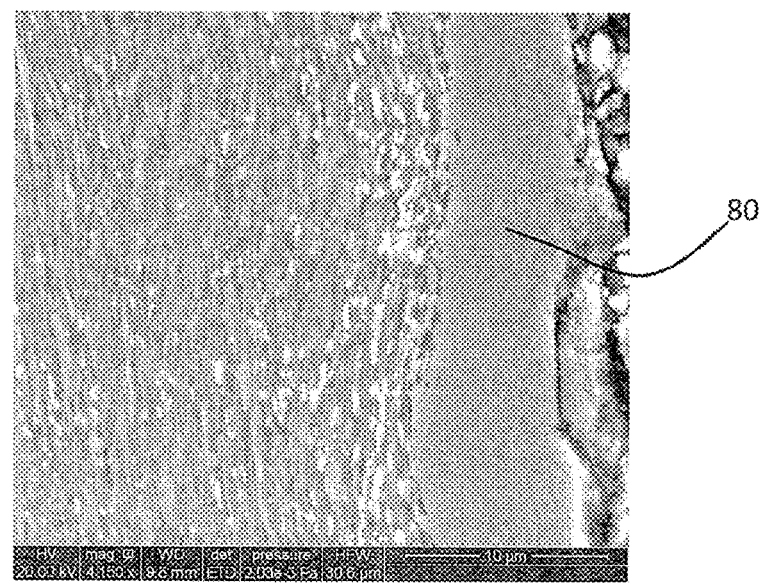

FIG. 26 is an electron microscopy image showing the cross section of the sample in the vicinity of its surface, for a gaseous nitriding treatment at 520° C. after prior nanostructuring. With the prior nanostructuring, the gaseous nitriding treatment at 520° C. maintains a layer of nanostructured material in which the carbonitride precipitates are finely dispersed in the grain boundaries without forming networks of carbonitrides in the layers affected by the nanostructuring treatment. The nitrogen diffusion depth, around 260 microns, is not negatively affected by the nanostructuring treatment. The enrichment content of nitrogen at the outermost surface in the white layer exceeds 14% in order to tend towards 18% with a nanostructuring treatment.

An additional hardening, estimated at around 10%, is obtained by the effect of the nanostructuring treatment not only at the surface but also on the first 100 microns. The surface hardness tends towards 1000 HV.

The thickness of the white layer 80 is very similar between the two treatments and is around 10 microns. At a depth of 50 microns, the nitrogen contents are close: 1.5% with nanostructuring and 1.3% without nanostructuring.

Figure 23:
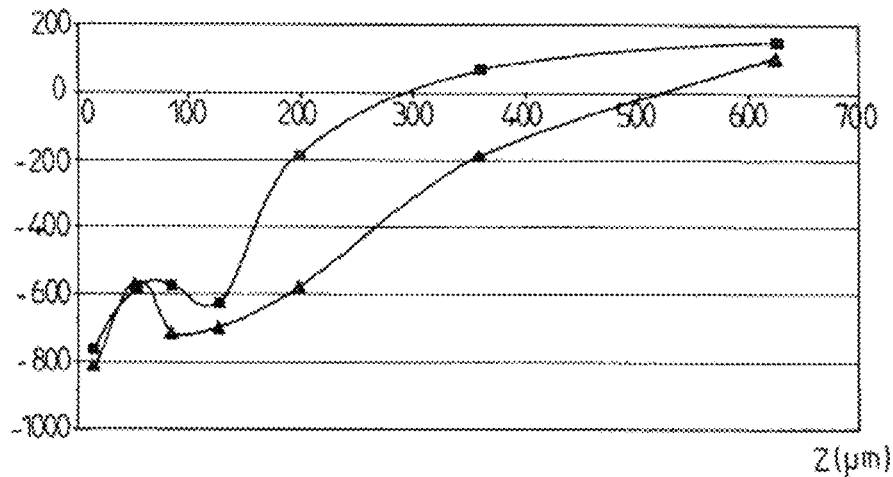
FIG. 23 is a graph representing the profile of the residual stresses respectively in a part treated successively by nanostructuring, nitriding process and shot-peening process and in a part treated only by the nitriding process and shot-peening process.

FIG. 23 represents the residual compressive stress as a function of the depth for various treatments:
- Squares: nitriding treatment followed by shot peening
- Triangles: nanostructuring treatment followed successively by a nitriding treatment and shot peening.

The two stress profiles are substantially identical in terms of compressive stress values to a depth of 50 μm. Beyond a depth of 50 μm, the sample treated by nanostructuring, nitriding and shot peening shows a significant increase in the stress values and depths with respect to a nitriding treatment and shot peening alone. The compressive depth increase is close to 200 microns. This may favour the fatigue behaviour if the shear stresses are deep and are located in this region, especially in the case of rolling stress.

Generally, it is observed that a peening having a coverage between 1000% and 2000% makes it possible to obtain the best compromise between the mechanical properties of hardening resulting from the relatively deep diffusion of the nitrogen and the surface finish of the steel on a structural steel, especially a 32CrMoV13 steel. Indeed, above 2000%, the deformations caused by the peening generate a surface finish which may prove unsuitable for the typical uses of such a steel, in particular in precision mechanics and gearing.

Test 9.3

A flat sample of X38CrMoV5 tool steel, quenched and double tempered to 40-43 HRC, subjected to a gaseous nitriding treatment at 520° C., is used.

Figure 27:
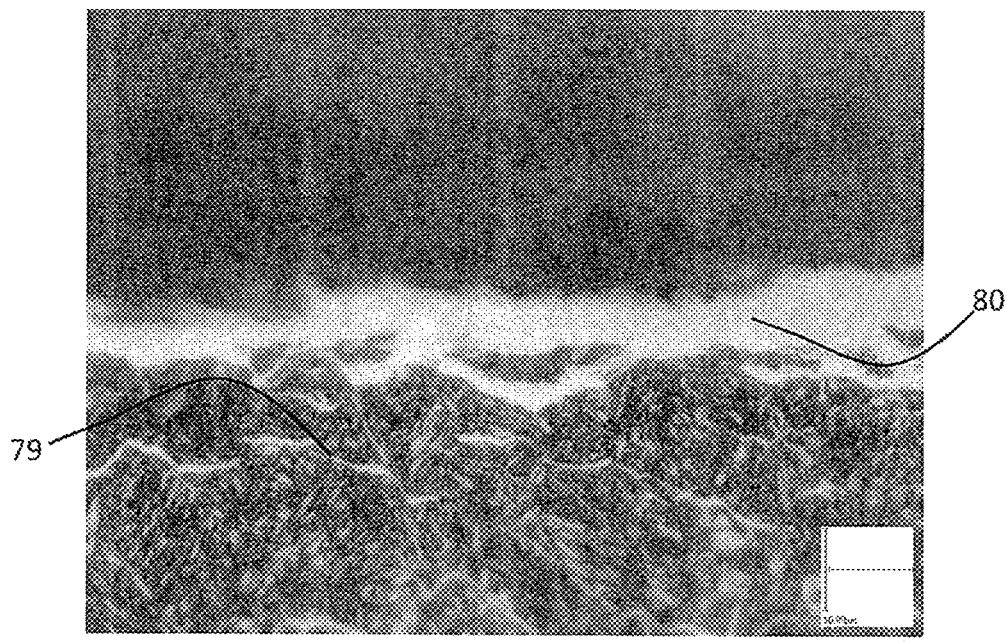
FIGS. 27 and 28 are optical microscopy images showing the cross section of a sample of tool steel X38CrMoV5 in the vicinity of its surface, for a gaseous nitriding treatment at 520° C. without and with prior nanostructuring.
Figure 28:
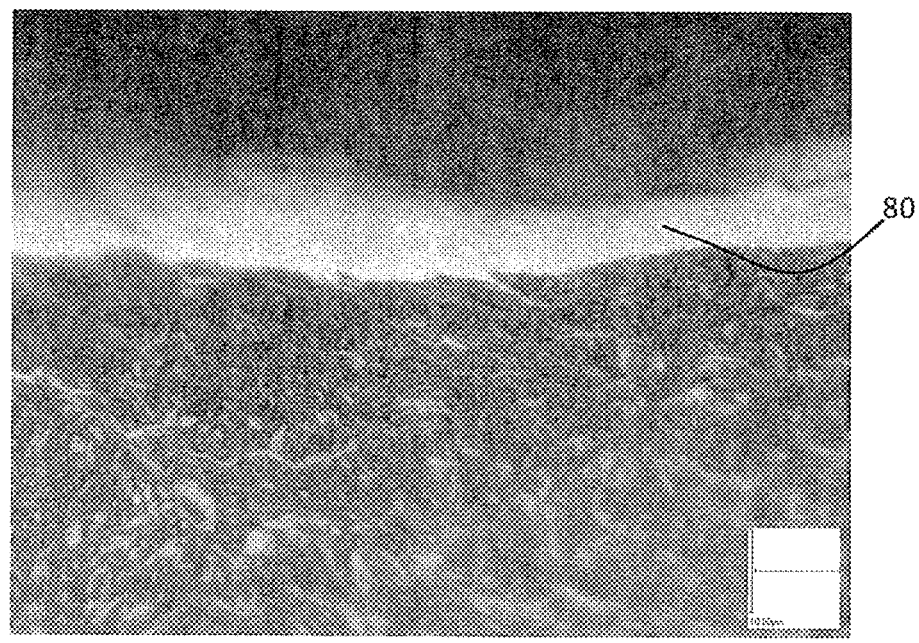

FIG. 27 is an optical microscopy image showing the cross section of the sample subjected to the nitriding treatment without prior nanostructuring. FIG. 28 is an optical microscopy image showing the cross section of the sample subjected to the nitriding treatment after prior nanostructuring. The region close to the surface of the sample is shown each time.

The nanostructuring treatment made it possible to retain a nanostructure with a high attenuation of the carbonitride network precipitates, visible at number 79 in FIG. 27. The nitriding treatment at 520° C. also made it possible to obtain a nitrided layer that was as deep with or without the nanostructuring treatment. The conventional depths of enrichment in nitrogen are respectively 145 microns without nanostructuring treatment and 170 microns with nanostructuring treatment. The surface Vickers hardnesses are of the same level and are around 1300 HV.

In this test too, the presence of a nanostructure therefore limits the precipitation of networks of carbonitrides under the white layer 80. The expected gain is therefore a better impact and spalling resistance under the combination layer. For tools such as those used in a forge or in a foundry, this results in a longer service life.

For tool steels, especially the X38CrMoV5 steel, it was observed that a nanostructured layer having a thickness of at least 40 μm enabled a significant improvement in the nitriding. Such a thickness may especially be obtained by a coverage of at least 3000% using type S170 shots. The use of shots of larger size, typically S280 or S330, would make it possible to obtain the same thickness with a reduced coverage but would significantly degrade the surface finish of the treated part.

High-Temperature Treatments

Low-temperature diffusion processes limit the atomic size of the elements that it is possible to make diffuse into the metal. On the other hand, in high-temperature processes, above around 750° C. for steel, a recrystallization occurs which may remove the surface nanostructuring. A high temperature is especially necessary in a low-pressure carbonitriding process, which consists in injecting hot nitrogen into a vacuum chamber and which makes it possible to limit the oxidation of the material with respect to conventional carbonitriding processes.

However, the inventors have discovered that it is also possible to obtain a fine-grain recrystallization when a previously peened part is subjected to a high-temperature process such as low-pressure carbonitriding. The recrystallization size depends on the degree of strain hardening obtained by peening, on the temperature and on the duration of the thermochemical treatment.

Owing to the fineness of the grains, for example greater than or equal to 10, preferably greater than or equal to 12 according to the NF A 04-102 standard, it is possible to obtain a high density of grain boundaries emerging at the surface, which favours the diffusion and makes it possible to increase the nitrogen concentration and optionally carbon concentration of the carbonitrided layers and the diffusion rates. In addition, it is also observed that the prior nanostructuring treatment makes it possible to inhibit the precipitation of dense carbonitride networks, which are a cause of brittleness of the surface of the part.

Low-pressure carbonitriding tests recounted below in relation to Table 7 illustrate these points.

Test 10

The treated sample is a pinion tooth. The inventors observed, for excessively intense nanostructuring conditions, a coarse-grain recrystallization. Thus a coverage of 400 to 1000% was identified as being the best peening condition.

In order to evaluate the recrystallization as a function of the time, the sample was subjected to tests of temperature rise following various modes in order to achieve a final hold at 880° C. Three total treatment times T were tested: 0.5 h, 1.5 h and 3 h. Each time, the sample was cooled in open air. It is furthermore known that the temperature rise kinetics of the furnace have an influence on the nature of the recrystallization and that a gradual heating favours a fine-grain recrystallization. This is why relatively gradual temperature rise curves were chosen in the examples below. In order to identify the best peening conditions, tests were carried out for different degrees of coverage and different types of shot. The grain index according to the NF A 04-102 standard was measured at the surface of each of the samples corresponding to a duration of the treatment and a corresponding degree of coverage.

The results of the tests have been listed in Table 11 below:

TABLE 11

Grain size measured on the sample as a function of the surface treatment carried out and the treatment time T

| Total time of the heat treatment | Without peening (R = 0%) | Prior peening S170, R = 500% | Prior peening S170, R = 750% | Prior peening S170, R = 1000% | Prior peening S280, R = 1000% |
|---|---|---|---|---|---|
| 0.5 h | 9 | ≥12 | ≥12 | ≥12 | ≥12 |
| 1.5 h | 9 | 12 | 12 | 11 | 8 to 9 |
| 3 h | 9 | 9 | 9 | 9 to 10 | 8 to 9 |

On the samples with nanostructuring, the following structures are observed at the end of the temperature rise and cooling:

T=0.5 h, corresponding to a gradual rise from 200 to 800° C.: very fine ferritic grains (index≥12) can be observed at the surface. Just below, a start of recrystallization is witnessed, but very quickly the structure without nanostructuring is encountered.

Figure 34:
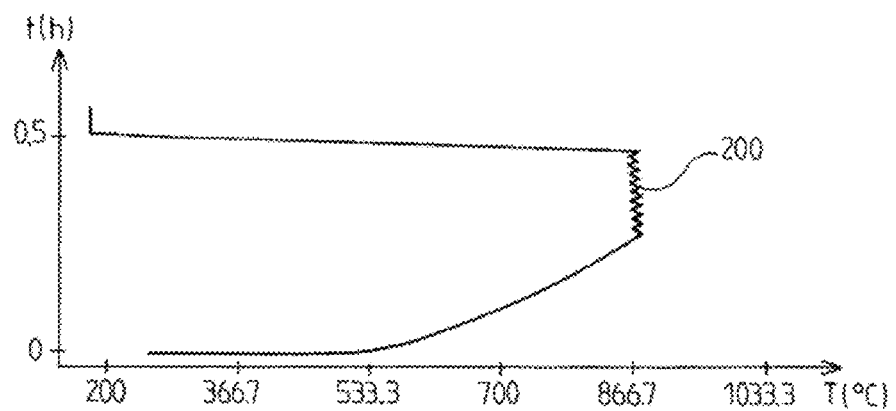
FIG. 34 is a graph representing the change in temperature as a function of time during a simulation of a temperature rise over 30 minutes up to the high level of a carbonitriding treatment (around 900° C.).

The temperature curve during test T=0.5 h is illustrated in FIG. 34. Firstly, the temperature rises gradually before reaching, at around T=0.3 h, a hold 200 at 880° C., the temperature hold 200 being maintained until T=0.5 h.

Although this short heat treatment appears highly advantageous owing to the fineness of the grains obtained at the surface, it cannot be adapted to all situations due to the thermal inertia of the materials, which may prevent a uniform temperature being obtained in the treated part in as short a time once the size of this part is large.

T=1.5 h corresponding to a rise from 200 to 800° C. with two intermediate holds: the very fine grains are also present at the surface for coverages of less than or equal to 1000% depending on the size of the shot. It is clearly observed that the recrystallization at the triple boundaries becomes increasingly visible and affects a greater depth when the coverage R increases. For R=1000%, an enlargement phenomena of the ferritic grains at the surface of this steel is noted, which results in a grain size index of less than 12.

Figure 35:
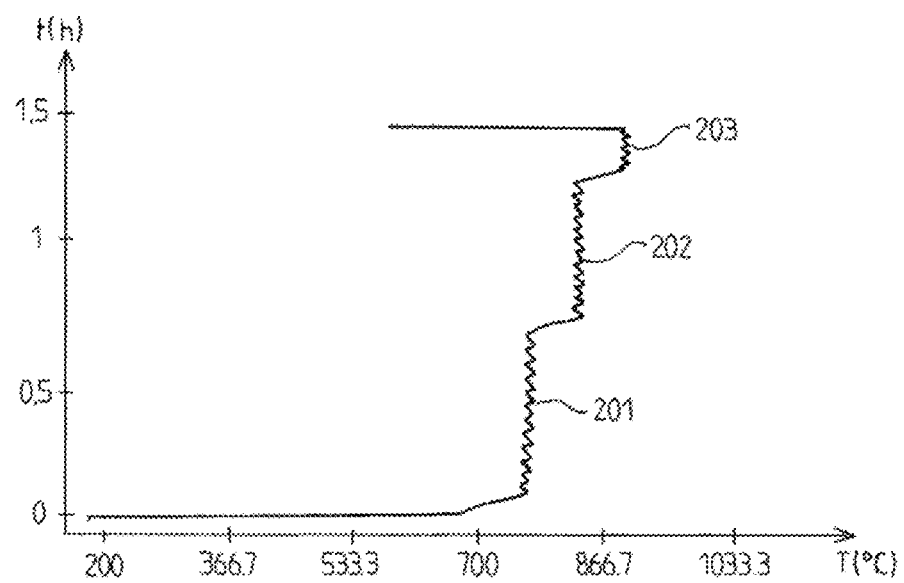
FIG. 35 is a graph representing the change in temperature as a function of time during a simulation of a temperature rise of the same type as FIG. 34 but with a duration of 1 h 30 min.

The temperature curve during test T=1.5 h is illustrated in FIG. 35. The temperature rises up to a hold 201 at 760° C. maintained until around T=0.75 h. The temperature is then increased up to a hold 202 having a temperature of around 850° C. maintained up to T=1.25 h, then the temperature is brought to a final hold 203 at 880° C. until the end of the test.

T=3 h corresponding to a rise from 200 to 800° C. with three intermediate holds: all of the nanostructurings tested result in an enlargement phenomena of the ferritic grains at the surface with indices of less than or equal to 9 and just under the surface. Then, underneath, a fine-grain recrystallization is perfectly identified.

Figure 36:
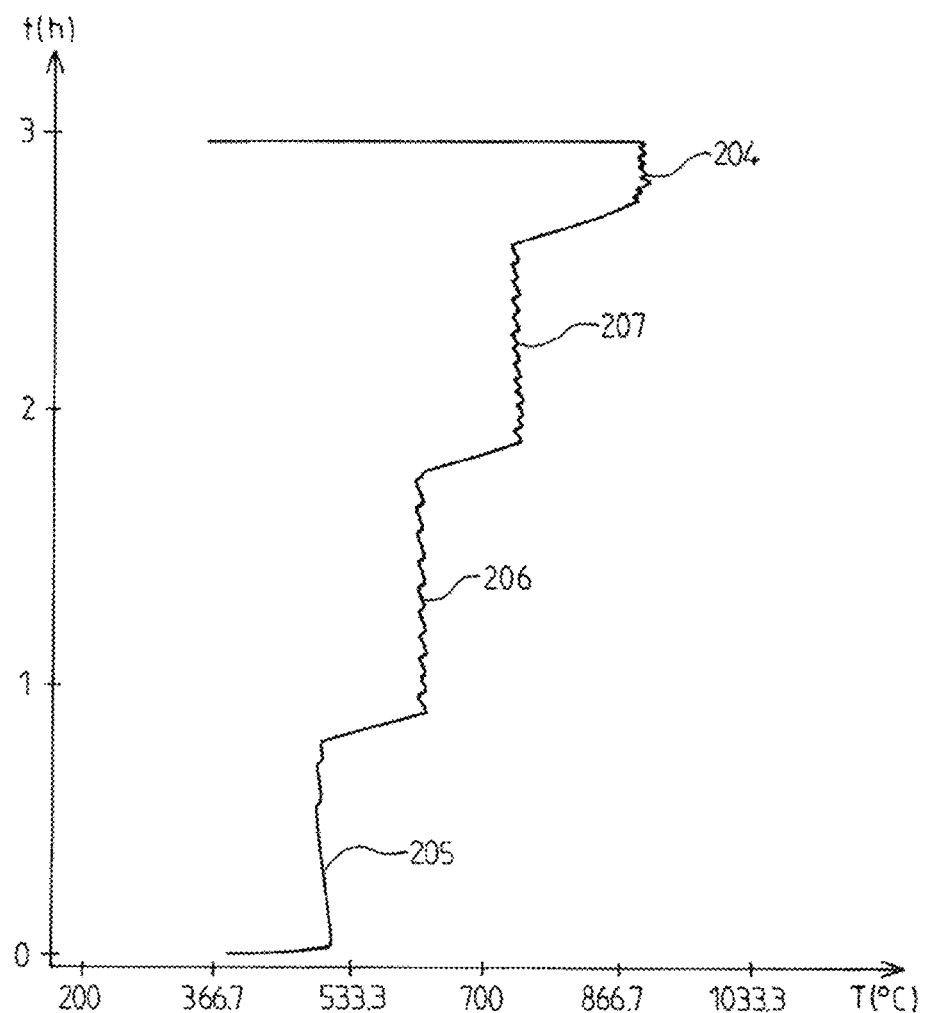
FIG. 36 is a graph representing the change in temperature as a function of time during a simulation of a temperature rise of the same type as FIG. 34 but with a duration of three hours.

The temperature curve during test T=3 h is illustrated in FIG. 36. During the test, the temperature is gradually brought to a temperature hold 204 of 880° C. by means of three temperature holds: a first hold 205 at a temperature of around 533° C. followed at T=1 h by a second hold 206 at a temperature of around 630° C., itself followed at T=2 h by a third hold 207 at a temperature of around 740° C. The hold 204 is achieved at around T=2.75 h.

It is therefore observed that a coarse-grain recrystallization (index<10) took place if the heat treatment time is too long, whereas it is possible to observe fine grains (index≥10) for heat treatments having a duration of less than three hours. The 1.5 h high-temperature treatment therefore appears to be a good compromise for obtaining a fine-grain recrystallization on standard mechanical parts. The grain size obtained depends however both on the heat treatment parameters and on the prior peening parameters.

Thus, it may be noted that too large a coverage, that is to say a coverage of greater than or equal to 1000%, favours the crystallization with coarser grains, in particular in the 1.5 h treatment. Furthermore, the inventors have observed that when the degree of coverage is too large, the deformations of the part that are produced by the peening become too large, which degrades its surface finish. This is especially the case for samples subjected to degrees of coverage of 1000%. Thus, the inventors have observed that a degree of coverage of less than or equal to 1000% made it possible to obtain the best compromise for the surface finish while avoiding the enlargement of the grains. In particular, in the case where the surface finish is an essential property of the part to be treated, it may be necessary to reduce the degree of coverage. In this case, a coverage of 400 to 500% may be chosen.

Similar quantitative and qualitative results have also been observed with samples consisting of 20MnCr5 and 27MnCr5 gearing-type steel. The above observations apply to other alloyed steels, especially gearing-type steels, for example the steels 20CrMo4, 27CrMo4, 18MnCrB5, 29MnCr5, 15MnCrMo5, 18NiCrMo5, or 20NiCrMo7.

For R=500% and T=1.5 h, the average grain size is around 3.3 µm, i.e. twelve emerging boundaries counted at the surface over 40 µm.

Figure 29:
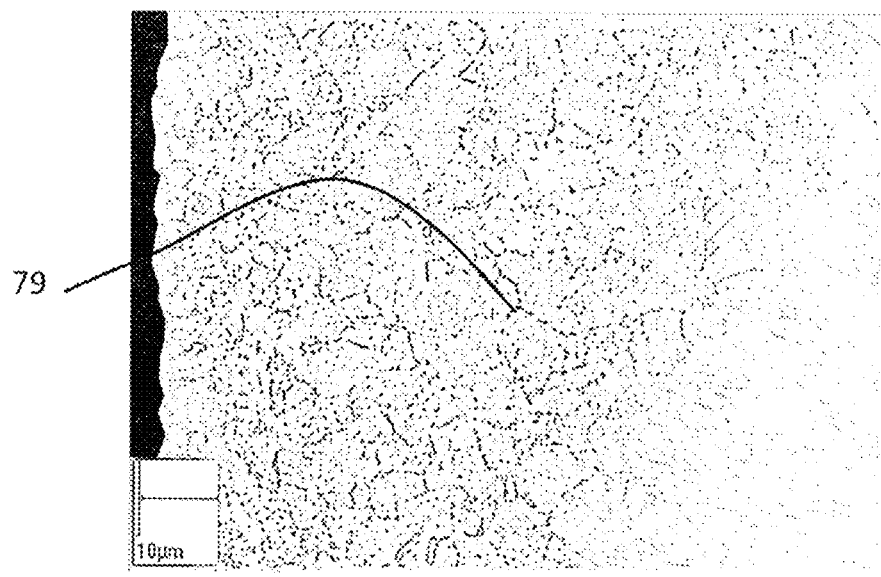
FIGS. 29 and 30 are optical microscopy images showing the cross section of a sample of steel of 23MnCrMo5 in the vicinity of its surface, for a low-pressure carbonitriding treatment without and with prior nanostructuring.
Figure 30:
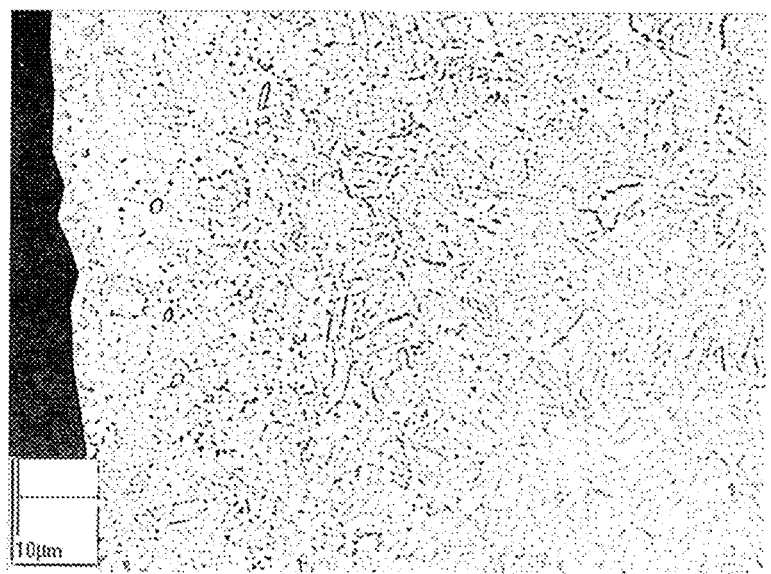

FIG. 29 is an optical microscopy image showing the cross section of the sample subjected to the low-pressure carbonitriding treatment without prior nanostructuring. FIG. 30 is an optical microscopy image showing the cross section of the sample subjected to the low-pressure carbonitriding treatment after prior nanostructuring. A region of the sample located between a depth of 0.4 and 0.6 mm is shown each time. For the low-pressure carbonitriding tests, the time T=1.5 h was retained. The tests led to it being observed that the nanostructuring makes the carbonitride networks disappear. Indeed, the structure observed at the end of the carbonitriding treatment is composed of martensite and a start of carbonitride network at the grain boundary is visible at number 79 on FIG. 29 for a sample without prior peening, whereas the surface with nanostructuring comprises only martensite, which is difficult to attack, in which globules of carbonitrides are distributed. The grain size index measured according to NF A 04-102 at the surface of the sample is equal to 9 for the sample from FIG. 29 and equal to 12 for the sample from FIG. 30. It may be assumed that the grain boundaries in which the globules of carbonitrides are located have a size proportional to the grain size, so that the fineness of the grains inhibits the percolation of the carbonitride precipitates in the form of connected networks.

Figure 24:
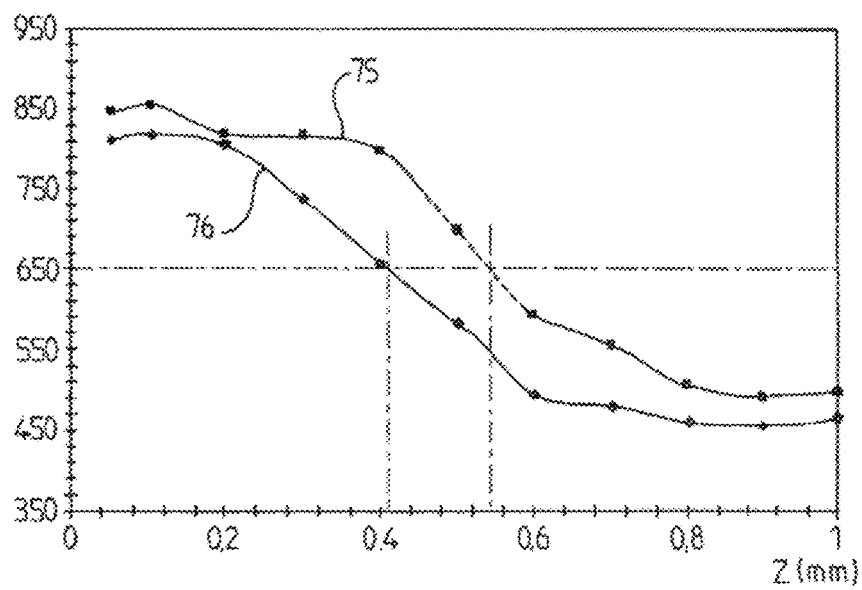
FIG. 24 is a graph representing the profile of the Vickers hardness respectively in a part treated successively by a peening process and a low-pressure carbonitriding process and in a part treated only by the low-pressure carbonitriding process.

FIG. 24 represents the hardness of the sample as a function of the depth after low-pressure carbonitriding, with prior peening (curve 75) and without peening (curve 76). A distinct increase in the depth hardened owing to the prior nanostructuring is observed, the depth at which a hardness of 650 is observed moving from 0.41 mm without nanostructuring to 0.54 mm with nanostructuring.

On the carbon concentration profile, no change is observed between the simply carbonitrided sample and the sample that has undergone both treatments. On the other hand, the nanostructuring improves the nitrogen concentration profile over the first two tenths of mm below the surface, which explains the higher hardness plateau. This gain is measured in Table 8 below.

TABLE 8 mass fraction of nitrogen (%) as a function of the depth after low-pressure carbonitriding

| Depth z (mm) | Sample without nanostructuring | Sample with nanostructuring | Gain (%) |
| --- | --- | --- | --- |
| 0.06 | 0.13 | 0.21 | 62 |
| 0.10 | 0.12 | 0.16 | 33 |
| 0.15 | 0.10 | 0.14 | 40 |
| 0.20 | 0.09 | 0.11 | 22 |
| 0.25 | 0.08 | 0.08 | 0 |

Although the invention has been described in connection with several particular embodiments, it is clearly obvious that it is in no way limited thereto and that it includes all the technical equivalents of the means described and also combinations thereof if the latter come under the scope of the invention.

In particular, the embodiments described in the examples relate to initially homogeneous materials on which the peening processes described make it possible to form relatively thick nanostructured surface layers. It is possible to characterize the degree of coverage applied to a given material by the thickness of the nanostructured layer that this coverage made it possible to obtain. Hence, the application of a similar degree of coverage to a material having undergone other prior treatments is also capable of effectively producing nanostructured surface layers, even if this pretreated material does not correspond to the examples described, for example a heterogeneous material.

The use of the verb "to have", "to comprise" or "to include" and its conjugated forms does not exclude the presence of elements or steps other than those mentioned in a claim. The use of the indefinite article "a" or "an" for an element or a step does not exclude, unless otherwise mentioned, the presence of a plurality of such elements or steps. Several means or modules may be represented by one and the same material element.

In the claims, any reference sign between parentheses should not be interpreted as a limitation of the claim.

TABLE 2 test 1, E24 steel, Rockwell hardness of the shots = 48HRC

| Type of shot | V (m/s) | R (%) | $z_n$ (μm) | Hardness of treated face (HV) | Hardness of untreated face (HV) | Hardness gain (%) |
|---|---|---|---|---|---|---|
| S170 | 57 | 100 | 0 | 198 | 108 | 83% |
|  |  | 150 | 0 | 211 | 114 | 85% |
|  |  | 200 | 0 | 200 | 113 | 77% |
|  |  | 300 | 0 | 212 | 111 | 91% |
|  |  | 500 | 0 | 241 | 112 | 115% |

TABLE 2-continued test 1, E24 steel, Rockwell hardness of the shots = 48HRC

| Type of shot | V (m/s) | R (%) | $z_n$ (μm) | Hardness of treated face (HV) | Hardness of untreated face (HV) | Hardness gain (%) |
|---|---|---|---|---|---|---|
|  |  | 750 | 69 | 256 | 108 | 137% |
|  |  | 1000 | 72 | 263 | 111 | 137% |
|  |  | 1500 | 91 | 274 | 116 | 136% |
|  |  | 3000 | 129 | 308 | 113 | 173% |
|  |  | 6000 | 138 | 309 | 113 | 173% |
|  |  | 10000 | 140 | 302 | 116 | 160% |
| S280 | 52 | 100 | 0 | 215 | 130 | 65% |
|  |  | 150 | 0 | 224 | 132 | 70% |
|  |  | 200 | 0 | 224 | 138 | 62% |
|  |  | 300 | 67 | 247 | 139 | 78% |
|  |  | 500 | 91 | 262 | 137 | 91% |
|  |  | 750 | 101 | 278 | 138 | 101% |
|  |  | 1000 | 120 | 290 | 113 | 157% |
|  |  | 1500 | 134 | 295 | 116 | 154% |
|  |  | 3000 | 143 | 298 | 114 | 161% |
|  |  | 6000 | 178 | 301 | 113 | 166% |
|  |  | 10000 | 172 | 315 | 114 | 176% |
| S330 | 60 | 100 | 0 | 213 | 114 | 87% |
|  |  | 150 | 0 | 233 | 116 | 101% |
|  |  | 200 | 0 | 234 | 110 | 113% |
|  |  | 300 | 111 | 264 | 111 | 138% |
|  |  | 500 | 112 | 253 | 108 | 134% |
|  |  | 750 | 142 | 282 | 114 | 147% |
|  |  | 1000 | 160 | 290 | 114 | 154% |
|  |  | 1500 | 175 | 298 | 112 | 166% |
|  |  | 3000 | 192 | 310 | 123 | 152% |
|  |  | 6000 | 193 | 300 | 131 | 129% |
|  |  | 10000 | 186 | 304 | 142 | 114% |
| S550 | 49 | 100 | 0 | 206 | 129 | 60% |
|  |  | 150 | 0 | 216 | 144 | 50% |
|  |  | 200 | 0 | 223 | 131 | 70% |
|  |  | 300 | 0 | 227 | 135 | 68% |
|  |  | 500 | 0 | 243 | 145 | 68% |
|  |  | 750 | 104 | 278 | 148 | 88% |
|  |  | 1000 | 176 | 292 | 147 | 99% |
|  |  | 1500 | 168 | 279 | 153 | 82% |
|  |  | 3000 | 164 | 292 | 159 | 84% |
|  |  | 6000 | 175 | 295 | 157 | 88% |
|  |  | 10000 | 173 | 308 | 167 | 84% |

TABLE 6 nitriding treatments after peening

| Definition of the test | Sample | Peening conditions | Nitriding conditions | Thickness of layer having high nitrogen content (μm) | Idem without peening (μm) | Nitrogen content at the surface (%) | Idem without peening (%) |
|---|---|---|---|---|---|---|---|
| Test 8.1 | 304L stainless steel | Size = S170 Har. = | Plasma at 350° C. for 100 h | 4 to 10 | 3 to 5 | 9 | 11 |
| Test 8.2 |  | 48 HRC V = 57 m/s R = 1125% $z_n$ = 80 μm | Plasma at 400° C. for 100 h | 8 to 15 | 8 to 10 | 12 | 12 |
| Test 9.1 | 32CrMoV13 steel (for gearing) | Size = S170 Har. = | Plasma at 480° C. for 50 h | 1 to 3 | 1 to 2 | 14 | 14 |
| Test 9.2 |  | 48 HRC V = 57 m/s R = 1875% $z_n$ = 90 μm | Gaseous nitriding at 520° C. for 50 h | 10 | 10 | 18 | 14 |

TABLE 6-continued nitriding treatments after peening

| Definition of the test | Sample | Peening conditions | Nitriding conditions | Thickness of layer having high nitrogen content (μm) | Idem without peening (μm) | Nitrogen content at the surface (%) | Idem without peening (%) |
|---|---|---|---|---|---|---|---|
| Test 9.3 | X38CrMoV5 steel (for forge tool) | Size = S170<br>Har. = 58 HRC<br>V = 57 m/s<br>R = 3000%<br>$z_n$ = 40 μm | Gaseous nitriding at 520° C. for 50 h | 14 | 10 | 12 | 10 |

TABLE 7 low-pressure carbonitriding treatments after peening

| Definition of the test | Sample | Peening conditions | Carbonitriding conditions |
|---|---|---|---|
| Test 10 | 23MnCrMo5 steel (for gearing) | Size = S170<br>Har. = 48 HRC<br>V = 57 m/s<br>R = 400%<br>$z_n$ = 40 μm | Low-pressure carbonitriding at 880° C. |

TABLE 10

Test 8, samples corresponding to test 1, E24 steel, Rockwell hardness of the shots = 48HRC

| Type of shot | V (m/s) | R (%) | $z_n$ (μm) | Hardness of treated face (HV) | Hardness of untreated face (HV) | Hardness gain (%) | $z_{nh}$ min. (μm) | $z_{nh}$ max. (μm) |
|---|---|---|---|---|---|---|---|---|
| S170 | 57 | 100 | 0.00 | 225 | 142 | 58% | | |
| | | 150 | 0.00 | 226 | 133 | 70% | | |
| | | 200 | 27.46* | 234 | 140 | 67% | | |
| | | 300 | 30.28* | 252 | 143 | 76% | | |
| | | 500 | 46.47* | 276 | 132 | 109% | | |
| | | 750 | 50.00* | 281 | 135 | 108% | | |
| | | 1000 | 54.22 | 288 | 140 | 106% | 49.29 | 62.67 |
| | | 1500 | 59.15 | 290 | 140 | 107% | 57.74 | 74.64 |
| | | 3000 | 81.69 | 292 | 131 | 123% | 69.01 | 92.25 |
| | | 6000 | 94.36 | 323 | 135 | 139% | 90.84 | 96.47 |
| | | 10000 | 87.32 | 327 | 127 | 157% | 73.23 | 95.77 |
| S330 | 60 | 100 | 0.00 | 240 | 136 | 76% | | |
| | | 150 | 35.21* | 244 | 136 | 79% | | |
| | | 200 | 34.50* | 253 | 139 | 82% | | |
| | | 300 | 39.43* | 260 | 135 | 93% | | |
| | | 500 | 67.60* | 267 | 129 | 107% | | |
| | | 750 | 69.71 | 284 | 128 | 122% | 61.26 | 90.14 |
| | | 1000 | 76.05 | 297 | 129 | 130% | 69.01 | 96.47 |
| | | 1500 | 111.26 | 299 | 126 | 137% | 102.11 | 121.83 |
| | | 3000 | 111.97 | 309 | 128 | 141% | 97.88 | 123.23 |
| | | 6000 | 123.94 | 310 | 157 | 97% | 109.50 | 139.43 |
| | | 10000 | 97.14 | 310 | 126 | 146% | 90.00 | 113.57 |
| S550 | 49 | 100 | 0.00 | 222 | 135 | 64% | | |
| | | 150 | 0.00 | 225 | 139 | 62% | | |
| | | 200 | 0.00 | 227 | 141 | 61% | | |
| | | 300 | 29.57* | 240 | 144 | 67% | | |
| | | 500 | 44.36* | 248 | 128 | 94% | | |
| | | 750 | 57.74* | 261 | 141 | 85% | | |
| | | 1000 | 98.59 | 271 | 134 | 102% | 76.76 | 161.97 |
| | | 1500 | 108.45 | 289 | 148 | 95% | 81.69 | 133.09 |
| | | 3000 | 97.18 | 295 | 132 | 123% | 83.80 | 146.47 |
| | | 6000 | 115.00 | 309 | 142 | 118% | 85.71 | 140.00 |
| | | 10000 | 119.28 | 325 | 144 | 126% | 98.57 | 150.00 |

The invention claimed is:

1. A process for the surface treatment of a metal part made of steel, comprising:

exposing a surface of the metal part to a stream of substantially spherical particles, so that any portion of said surface receives said particles along several primary incidences, the primary incidences of the particles on a portion of the surface being essentially distributed in a cone or a conical film which has an outer half apex angle ($\alpha$, $\alpha+\beta$, $\alpha-\beta$) between 10° and 45°, until a surface layer of nanostructures is obtained, the particles having a diameter of less than 2 mm and greater than 0.1 mm and being projected at a speed between 40 m/s and 100 m/s, and exposing the surface of the metal part to thermochemical conditions that lead to the diffusion of a substance into the metal structure of the part in order to modify the chemical composition of the metal part over at least one part of its thickness starting from the surface, the thermochemical conditions being low-pressure carbonitriding conditions at a temperature between 750° C. and 1100° C. that lead to a recrystallization of the surface layer of nanostructures and a diffusion of nitrogen into the grain boundaries of the steel of the recrystallized surface layer, the process producing the formation of carbonitride particles finely dispersed in the recrystallized surface layer.

2. The process according to claim 1, in which the step of exposing the metal part to the thermochemical conditions comprises:

subjecting the metal part to a gradual temperature rise up to said carbonitriding temperature; and holding the temperature at said carbonitriding temperature, the combined duration of the temperature rise and of the temperature hold being less than three hours.

3. The process according to claim 2, in which the combined duration is between 0.5 and 1.5 hours.

4. The process according to claim 1, in which the surface is exposed to the stream of particles with a degree of coverage of between 400% and 1000%.

5. The process according to claim 1, in which the grains of the steel in the vicinity of the surface of the nitrided or carbonitrided part have a size index greater than or equal to 10 according to NF A 04-102.

6. The process according to claim 1, in which the substantially spherical particles have a diameter of greater than 0.3 mm and of less than 1.4 mm.

7. The process according to claim 1, in which the incidences of the substantially spherical particles are distributed substantially continuously.

8. The process according to claim 1, in which the cone or the conical film has an outer half apex angle of between 10° and 30°.

9. The process according to claim 1, in which the stream of particles comprises a jet of particles projected along a central direction, the metal part being fixed to a support so as to present said surface oriented obliquely with respect to said central direction, the support being rotated about an axis coaxial with the central direction of the jet of particles.

10. The process according to claim 9, in which the inclination of the surface of the part ($\alpha$) with respect to the central direction is between 10° and 30°, preferably close to 15°.

11. The process according to claim 1, in which the substantially spherical particles are projected at a speed of between 50 and 80 m/s.

12. The process according to claim 1, in which the substantially spherical particles have a hardness greater than the hardness of the surface of the part before treatment.

* * * * *